United States Patent
Chen et al.

(10) Patent No.: US 9,916,193 B2
(45) Date of Patent: Mar. 13, 2018

(54) ZONE SELECTIVE INTERLOCKING DEVICE

(71) Applicant: Siemens Aktiengesellschaft, Munich (DE)

(72) Inventors: Wei Gang Chen, Shanghai (CN); Mario Dankert, Raguhn-Jessnitz (DE); Feng Du, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 245 days.

(21) Appl. No.: 14/552,650

(22) Filed: Nov. 25, 2014

(65) Prior Publication Data

US 2015/0199225 A1   Jul. 16, 2015

(30) Foreign Application Priority Data

Jan. 16, 2014   (CN) .......................... 2014 1 0021271

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0745* (2013.01); *G06F 13/4027* (2013.01); *H02H 1/0061* (2013.01); *H02H 7/30* (2013.01)

(58) Field of Classification Search
CPC ... G06F 11/079; G06F 11/0745; H02H 7/261; H02H 7/262; H02H 7/30
See application file for complete search history.

(56) References Cited

U.S. PATENT DOCUMENTS

2008/0198521 A1   8/2008   Weiher et al.
2016/0141861 A1*  5/2016   Dougherty ............... H02H 7/30
                                                361/93.1

FOREIGN PATENT DOCUMENTS

CN        101102056 A     1/2008
CN        101902037 A    12/2010
(Continued)

OTHER PUBLICATIONS

Office Action for Corresponding Chinese Application No. 201410021271.5 dated Mar. 1, 2017.

*Primary Examiner* — Michael Maskulinski
(74) *Attorney, Agent, or Firm* — Harness, Dickey & Pierce, P.L.C.

(57) ABSTRACT

A zone selective interlocking device includes a first port, a second port, an input bus, an output bus and a query signal receiving branch. The first and second port each are switchable between two states, connected to the input bus and connected to the output bus, and the zone selective interlocking device is operable in a first mode. In the first mode, the query signal receiving branch is turned on. Within a preset timeslot, a link fault query signal is permitted to be inputted to the query signal receiving branch through the first port, while a link fault query signal is prevented from being inputted to the query signal receiving branch through the second port. Based on whether a link fault query signal is received within the timeslot, a judgment is made on whether a fault has occurred in a communication link connected to a corresponding port.

23 Claims, 14 Drawing Sheets

(51) Int. Cl.
    *G06F 13/40*     (2006.01)
    *H02H 1/00*     (2006.01)
    *H02H 7/30*     (2006.01)

(56) References Cited

FOREIGN PATENT DOCUMENTS

| | | | |
|---|---|---|---|
| CN | 101917291 | A | 12/2010 |
| EP | 1098414 | A2 | 5/2001 |

* cited by examiner

ZONE SELECTIVE INTERLOCKING DEVICE

PRIORITY STATEMENT

The present application hereby claims priority under 35 U.S.C. § 119 to Chinese patent application number CN 201410021271.5 filed Jan. 16, 2014, the entire contents of which are hereby incorporated herein by reference.

TECHNICAL FIELD

At least one embodiment of the present invention generally relates to the technical field of power distribution, in particular to a zone selective interlocking device for switches.

BACKGROUND ART

In a known power distribution system, current is distributed to different device branches or electrical devices with the aid of switches (circuit breakers) in a switch mechanism, especially low-voltage circuit breakers. These switches are each designed for a given rated current, and cut off the flow of current when a fault (such as a short circuit) occurs. Only those device branches which are affected by the fault or are closest to the fault are cut off. Such an operation is called selective breaking.

Inside each switch are provided a current transformer and a trip unit. The current transformer detects current flowing through the switch device, while the trip unit checks whether this current meets a specified condition (such as a current condition).

When selective breaking is implemented, these switches communicate with each other. When a situation occurs in which the specified current condition is met due to a short circuit, a switch located downstream in the power supply direction notifies a switch lying upstream of itself of this situation by means of a signal (e.g. a locking signal or delay signal). In this case, this upstream switch, which has similarly discovered the short circuit, temporarily refrains from tripping, instead waiting for a given delay time to observe whether the downstream switch trips. If the downstream switch has still not tripped when the delay time expires, then the upstream switch cuts off the current itself. Such a selective breaking solution is generally referred to as Zone Selective Interlocking (or ZSI for short).

Furthermore, in some power distribution systems, the power supply direction may change. For instance, if there are multiple feeder power supplies, the disconnection or connection of one power supply might cause a reversal of the direction of flow of current through one or more switches. This will cause a change in the upstream/downstream relationship amongst some of the switches in the ZSI system, so that the directions in which ZSI signals (locking signals or delay signals) are transmitted must be adjusted appropriately in order to achieve selective breaking.

Siemens has proposed a corresponding solution in which a technically simple communicative connection amongst switches, which is able to adapt to changes in the power supply direction, is realized. For convenience of description, this text refers to this type of zone selective interlocking, in which changes in power supply direction are taken into account, as directional zone selective interlocking (i.e. Directional ZSI, or DZSI for short). However, existing DZSI solutions do not take into account inspection of faults in the DZSI communication links. If a DZSI communication link fails (i.e. develops a fault) and this cannot be discovered promptly, then serious loss may result.

Furthermore, a DZSI system may comprise different types of switches. FIGS. 1 and 2 each show a typical mixed DZSI system formed by a 3WL ACB DZSI subsystem and an SnG MCCB DZSI subsystem. 3WL ACB and SnG MCCB are two typical switch types from Siemens, wherein the 3WL ACB is a frame-type circuit breaker, while the SnG MCCB is a low-voltage molded-case circuit breaker. The ZSI devices of SnG MCCBs currently on the market all lack directional selection functionality, generating and transmitting ZSI signals in accordance with old protocols and port definitions, so such a mixed DZSI system has higher requirements in terms of compatibility of inter-switch communication. A major difficulty currently faced is how to enable the ZSI device of an SnG MCCB to transmit DZSI signals (ZSI signals transmitted in a DZSI system may be referred to as DZSI signals) reliably and in an orderly way, and how to realize automatic inspection of DZSI communication link faults between switches of different types.

SUMMARY

At least one embodiment of the present invention provides at least an improvement, or even a solution, enabling automatic inspection of a communication link between switches in a power distribution system.

At least one embodiment of the present invention provides at least an improvement, or even a solution, which facilitates upgrading of an existing ZSI device lacking directional selection functionality so that it can transmit DZSI signals reliably and effectively, while also enabling automatic inspection of a communication link between switches.

According to one embodiment of the present invention, a zone selective interlocking device comprises a first port, a second port, an input bus, an output bus and a query signal receiving branch, the two ends of the input bus and output bus being connected to the first port and second port, respectively, the first port and second port each being capable of switching between two states, namely being connected to the input bus and being connected to the output bus, and the zone selectivity interlocking device being capable of operating in a first mode; in the first mode, the query signal receiving branch is turned on, and within a preset timeslot, a link fault query signal is permitted to be inputted to the query signal receiving branch through one port, while a link fault query signal is prevented from being inputted to the query signal receiving branch through another port, wherein the port is one of the first port and the second port; and based on whether a link fault query signal is received within the preset timeslot, a judgment is made on whether a fault has occurred in a communication link connected to a corresponding port. The zone selective interlocking device can perform automatic inspection of communication links between switches in a power distribution system.

According to another embodiment of the present invention, a zone selective interlocking device is provided, comprising: a first port, a second port, an input bus, an output bus (the buses in embodiments of the present invention may also be called bus bars), a query signal receiving branch, a communication signal sending branch connected to the output bus, and a communication signal receiving branch connected to the input bus; the two ends of the input bus and output bus are connected to the first port and second port, respectively, the first port and second port are each capable of switching between two states, namely being connected to the input bus and being connected to the output bus, and the zone selective interlocking device can switch between a first mode and a second mode; in the first mode, the communication signal receiving branch and communication signal sending branch are turned off, while the query signal receiving branch is turned on, and within a preset timeslot, a link fault query signal is permitted to be inputted to the query signal receiving branch through one port, while a link fault query signal is prevented from being inputted to the query signal receiving branch through another port, wherein the port is one of the first port and the second port; and based on whether a link fault query signal is received within the preset timeslot, a judgment is made on whether a fault has occurred in a communication link connected to a corresponding port; in the second mode, the communication signal receiving branch and communication signal sending branch are turned on, while the query signal receiving branch is turned off, and one of the first port and second port is set to be in the state of being connected to the input bus, while the other port is set to be in the state of being connected to the output bus.

According to another embodiment of the present invention, a zone selective interlocking device is provided comprising: a first port, a second port, an input bus, an output bus, a query signal sending branch, a communication signal sending branch connected to the output bus, and a communication signal receiving branch connected to the input bus, the two ends of the input bus and output bus being connected to the first port and second port, respectively, the first port and second port each being capable of switching between two states, namely being connected to the input bus and being connected to the output bus, the second port also being capable of switching between two states, namely being connected to the input bus and being connected to the output bus, and the zone selective interlocking device being capable of switching between a third mode and a second mode; in the third mode, the communication signal receiving branch and communication signal sending branch are turned off, while the query signal sending branch is turned on, and within a preset timeslot, a link fault query signal is permitted to be outputted from the query signal sending branch to one port, while a link fault query signal is prevented from being outputted from the query signal sending branch to another port, wherein the port is one of the first port and the second port; and based on whether a link fault query signal is sent out within the preset timeslot, a judgment is made on whether a fault has occurred in a communication link connected to a corresponding port; in the second mode, the communication signal receiving branch and communication signal sending branch are turned on, while the query signal receiving branch is turned off, and one of the first port and second port is set to be in the state of being connected to the input bus, while the other port is set to be in the state of being connected to the output bus.

Furthermore, an embodiment of the present invention also provides a communication method based on the zone selective interlocking system mentioned above, comprising: each switch performing the following steps: 1) a zone selective interlocking device of a non-query switch operates in the first mode, and a zone selective interlocking device of a query switch operates in the third mode; 2) when a fault which necessitates transmission of a zone selective interlocking signal is detected, the zone selective interlocking devices of the non-query switch and query switch both switch to operation in the second mode; 3) when it is detected that the fault which necessitated transmission of a zone selective interlocking signal has disappeared, return to step 1). By inspecting the current in the power distribution circuit it controls, a switch can determine whether a fault which necessitates transmission of a zone selective interlocking signal has occurred. For example, when the current in the power distribution circuit controlled by a switch is greater than a preset threshold, it can be determined that a short-delay short circuit current has occurred, at which point the switch needs to transmit a zone selective interlocking signal to another switch. In step 2), when a fault which necessitates transmission of a zone selective interlocking signal is detected, after waiting for a preset length of time to determine the present power supply direction, one of the first port and second port is set to be in the state of being connected to the input bus according to the present power supply direction so determined, while the other is set to be in the state of being connected to the output bus, so as to switch the zone selective interlocking device to operation in the second mode. At the same time as realizing reliable, orderly transmission of DZSI signals between switches of different types, the above communication method can make use of automatic inspection throughout the DZSI system to promptly discover communication link faults, including faults which occur in communication links connecting switches of different types; this enables erroneous DZSI signal exchange between switches of different types to be avoided. It is also possible to accurately determine the position of the occurrence of a communication link fault anywhere in the DZSI system, greatly facilitating equipment maintenance.

BRIEF DESCRIPTION OF THE ACCOMPANYING DRAWINGS

The accompanying drawings listed below are merely intended to illustrate and explain the present invention schematically, without defining the scope thereof. Wherein.

DETAILED DESCRIPTION OF THE EXAMPLE EMBODIMENTS

Figure 1:
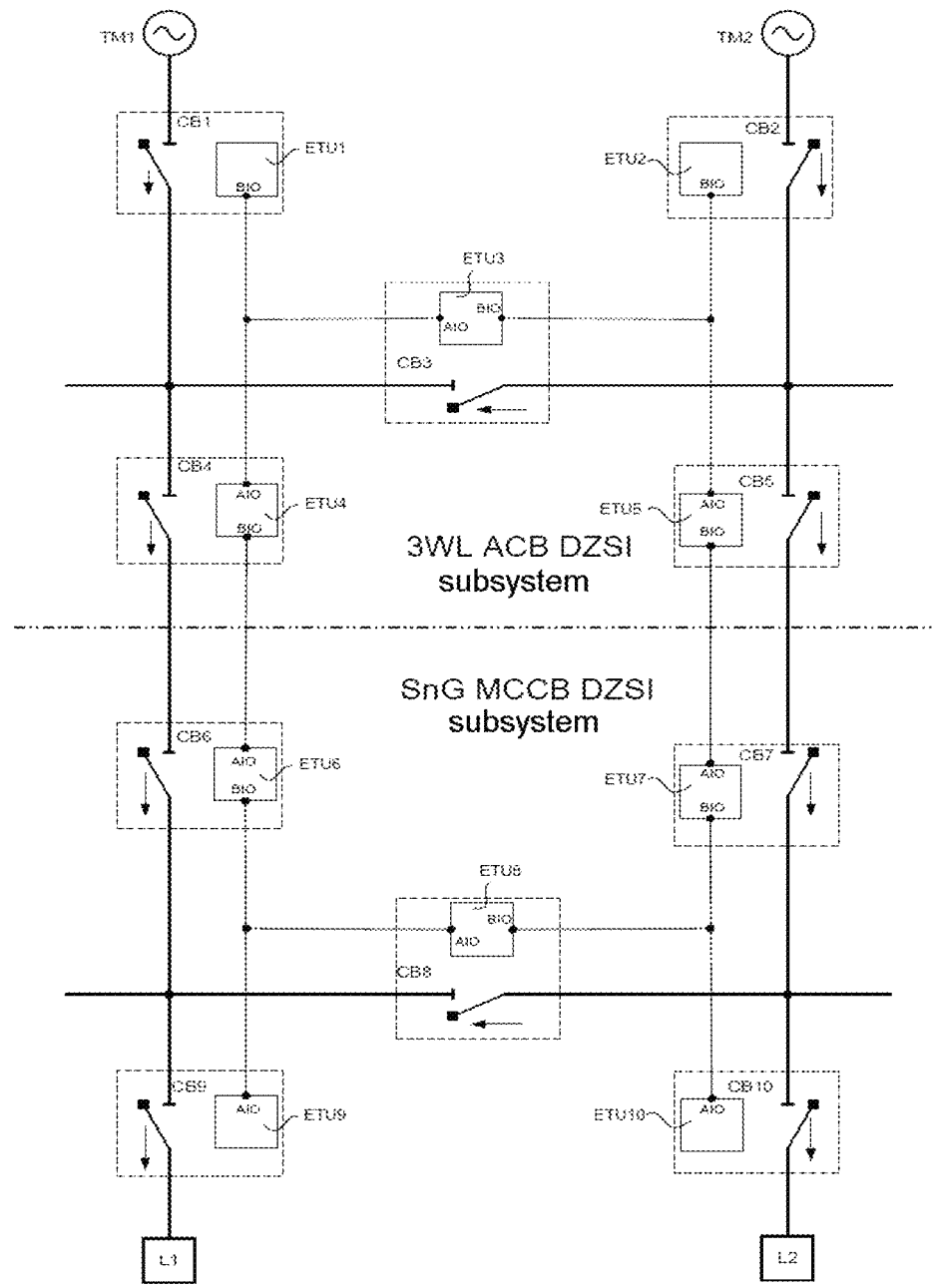
FIG. 1 shows a typical mixed DZSI system formed by a 3WL ACB DZSI subsystem and an SnG MCCB DZSI subsystem.
Figure 2:
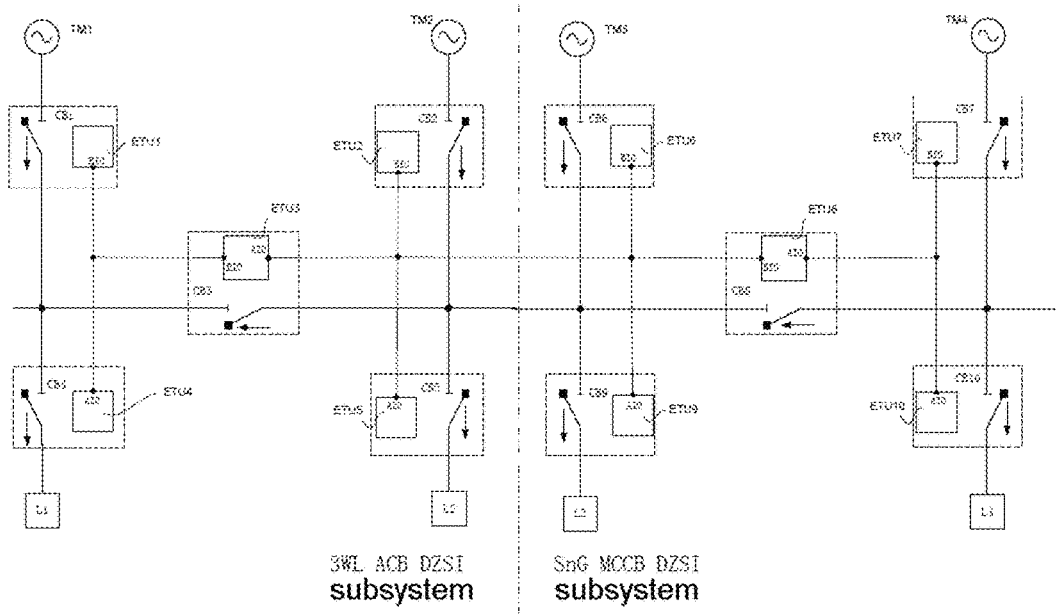
FIG. 2 shows another typical mixed DZSI system formed by a 3WL ACB DZSI subsystem and an SnG MCCB DZSI subsystem.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to one embodiment of the present invention, a zone selective interlocking device comprises a first port, a second port, an input bus, an output bus and a query signal receiving branch, the two ends of the input bus and output bus being connected to the first port and second port, respectively, the first port and second port each being capable of switching between two states, namely being connected to the input bus and being connected to the output bus, and the zone selectivity interlocking device being capable of operating in a first mode; in the first mode, the query signal receiving branch is turned on, and within a preset timeslot, a link fault query signal is permitted to be inputted to the query signal receiving branch through one port, while a link fault query signal is prevented from being inputted to the query signal receiving branch through another port, wherein the port is one of the first port and the second port; and based on whether a link fault query signal is received within the preset timeslot, a judgment is made on whether a fault has occurred in a communication link connected to a corresponding port. The zone selective interlocking device can perform automatic inspection of communication links between switches in a power distribution system.

According to another embodiment of the present invention, a zone selective interlocking device is provided, comprising: a first port, a second port, an input bus, an output bus (the buses in embodiments of the present invention may also be called bus bars), a query signal receiving branch, a communication signal sending branch connected to the output bus, and a communication signal receiving branch connected to the input bus; the two ends of the input bus and output bus are connected to the first port and second port, respectively, the first port and second port are each capable of switching between two states, namely being connected to the input bus and being connected to the output bus, and the zone selective interlocking device can switch between a first mode and a second mode; in the first mode, the communication signal receiving branch and communication signal sending branch are turned off, while the query signal receiving branch is turned on, and within a preset timeslot, a link fault query signal is permitted to be inputted to the query signal receiving branch through one port, while a link fault query signal is prevented from being inputted to the query signal receiving branch through another port, wherein the port is one of the first port and the second port; and based on whether a link fault query signal is received within the preset timeslot, a judgment is made on whether a fault has occurred in a communication link connected to a corresponding port; in the second mode, the communication signal receiving branch and communication signal sending branch are turned on, while the query signal receiving branch is turned off, and one of the first port and second port is set to be in the state of being connected to the input bus, while the other port is set to be in the state of being connected to the output bus.

In one embodiment, in the first mode, the preset timeslot comprises a first timeslot and a second timeslot; within the first timeslot, the first port is set to be in the state of being connected to the input bus, while the second port is set to be in the state of being connected to the output bus; within the second timeslot, the first port is set to be in the state of being connected to the output bus, while the second port is set to be in the state of being connected to the input bus.

In another embodiment, the zone selective interlocking device also comprises a first switch unit disposed on the input bus, there are two said query signal receiving branches, the two query signal receiving branches being connected to the input bus on the two sides of the first switch unit; in the first mode, the first switch unit is turned off, and within the preset timeslot, the first port is set to be in the state of being connected to the input bus, to permit a link fault query signal to be inputted to one of the query signal receiving branches through the first port, while the second port is set to be in the state of being connected to the input bus, to permit a link fault query signal to be inputted to the other query signal receiving branch through the second port; in the second mode, the first switch unit is turned on.

The zone selective interlocking device described above may be used for a non-query switch, to realize signal transmission between switches in a power distribution system (e.g. transmission of zone selective interlocking signals, i.e. ZSI signal transmission). Moreover, once a non-query switch is connected to a query switch, it is possible to automatically inspect faults in the communication link therebetween, and determine the position of such faults. In particular, the zone selective interlocking device described above is highly versatile, being compatible with switches of different types, and is especially suitable for mixed DZSI systems, being able to perform automatic inspection of DZSI communication links between switches of different types, and transmit DZSI signals through DZSI communication links between switches of different types. A query switch is a switch which sends a link fault query signal during fault inspection, whereas a non-query switch is a switch which receives a link fault query signal during fault inspection. Furthermore, in the above embodiment, the communication signal sending branch and communication signal receiving branch may make direct use of communication protocols and interface definitions etc. of existing ZSI devices lacking directional selection functionality to generate and transmit selective interlocking signals, and therefore make it very easy to realize DZSI signal transceiving by upgrading existing ZSI devices lacking directional selection functionality.

Taking the embodiments described above as a starting point, the zone selective interlocking device may further comprise a query signal sending branch connected to the output bus, and be set to be in a first configuration or a second configuration; when set to be in the first configuration, the zone selective interlocking device switches between the first mode and the second mode, wherein the query signal sending branch is turned off in the second mode; when set to be in the second configuration, the zone selective interlocking device switches between the second mode and a third mode, wherein the query signal sending branch is turned off in the second mode; in the third mode, the communication signal receiving branch and communication signal sending branch are turned off, while the query signal sending branch is turned on, and within a preset timeslot, a link fault query signal is permitted to be outputted from the query signal sending branch to one port, while a link fault query signal is prevented from being outputted from the query signal sending branch to another port, wherein the port is one of the first port and the second port; and based on whether a link fault query signal is sent out within the preset timeslot, a judgment is made on whether a fault has occurred in a communication link connected to a corresponding port.

In one embodiment, in the third mode, the preset timeslot comprises a first timeslot and a second timeslot; within the first timeslot, the first port is set to be in the state of being connected to the output bus, while the second port is set to be in the state of being connected to the input bus; within the second timeslot, the first port is set to be in the state of being connected to the input bus, while the second port is set to be in the state of being connected to the output bus.

In another embodiment, the zone selective interlocking device further comprises a second switch unit disposed on the output bus, with two said query signal sending branches being connected to the output bus on the two sides of the second switch unit, respectively; in the third mode, the second switch unit is turned off, and within the preset timeslot, the first port is set to be in the state of being connected to the output bus, to permit a link fault query signal to be outputted from one of the query signal sending branches to the first port, while the second port is set to be in the state of being connected to the output bus, to permit a link fault query signal to be outputted from the other query signal sending branch to the second port; in the second mode, the second switch unit is turned on.

The zone selective interlocking device in the above embodiment may be used for non-query switches as well as query switches, to realize signal transmission between switches in a power distribution system; in addition, it can automatically inspect faults in the communication link therebetween and determine the position of such faults. In particular, the zone selective interlocking device described above is highly versatile, being compatible with switches of different types, and is especially suitable for mixed DZSI systems, being able to perform automatic inspection of DZSI communication links between switches of different types, and transmit DZSI signals through DZSI communication links between switches of different types. It must be explained that in the present invention, it may not be necessary to have an independent communication signal sending branch and independent communication signal receiving branch; the communication protocol and interfaces could be redefined to enable the query signal sending branch and query signal receiving branch to realize DZSI signal transceiving, but in this case it would be difficult to realize DZSI signal transceiving by upgrading an existing ZSI device lacking directional selection functionality.

According to another embodiment of the present invention, a zone selective interlocking device is provided comprising: a first port, a second port, an input bus, an output bus, a query signal sending branch, a communication signal sending branch connected to the output bus, and a communication signal receiving branch connected to the input bus, the two ends of the input bus and output bus being connected to the first port and second port, respectively, the first port and second port each being capable of switching between two states, namely being connected to the input bus and being connected to the output bus, the second port also being capable of switching between two states, namely being connected to the input bus and being connected to the output bus, and the zone selective interlocking device being capable of switching between a third mode and a second mode; in the third mode, the communication signal receiving branch and communication signal sending branch are turned off, while the query signal sending branch is turned on, and within a preset timeslot, a link fault query signal is permitted to be outputted from the query signal sending branch to one port, while a link fault query signal is prevented from being outputted from the query signal sending branch to another port, wherein the port is one of the first port and the second port; and based on whether a link fault query signal is sent out within the preset timeslot, a judgment is made on whether a fault has occurred in a communication link connected to a corresponding port; in the second mode, the communication signal receiving branch and communication signal sending branch are turned on, while the query signal receiving branch is turned off, and one of the first port and second port is set to be in the state of being connected to the input bus, while the other port is set to be in the state of being connected to the output bus.

In one embodiment, in the third mode, the preset timeslot comprises a first timeslot and a second timeslot; within the first timeslot, the first port is set to be in the state of being connected to the output bus, while the second port is set to be in the state of being connected to the input bus; within the second timeslot, the first port is set to be in the state of being connected to the input bus, while the second port is set to be in the state of being connected to the output bus.

In another embodiment, the zone selective interlocking device further comprises a second switch unit disposed on the output bus, there are two said query signal sending branches, the two query signal sending branches being connected to the output bus on the two sides of the second switch unit, respectively; in the third mode, the second switch unit is turned off, and within the preset timeslot, the first port is set to be in the state of being connected to the output bus, to permit a link fault query signal to be outputted from one of the query signal sending branches to the first port, and the second port is set to be in the state of being connected to the output bus, to permit a link fault query signal to be outputted from the other query signal sending branch to the second port; in the second mode, the second switch unit is turned on.

The zone selective interlocking device in the above embodiment may be used for a query switch, to realize signal transmission between switches in a power distribution system; in addition, once a query switch is connected to a non-query switch, it is possible to automatically inspect faults in the communication link therebetween and determine the position of such faults. In particular, the zone selective interlocking device described above is highly versatile, being compatible with switches of different types, and is especially suitable for mixed DZSI systems, being able to perform automatic inspection of DZSI communication links between switches of different types, and transmit DZSI signals through DZSI communication links between switches of different types.

Furthermore, the query signal receiving branch comprises the following, connected in series: a power supply, a current-limiting resistor, a switch unit, and a sensitive element for identifying a change in current or voltage in the circuit formed by the series-connected power supply, current-limiting resistor and switch unit. The sensitive element is an LED which is connected in series in the circuit formed by the series-connected power supply, current-limiting resistor and switch unit. The query signal sending branch comprises: a bipolar junction transistor, an LED and a switch unit connected in series, wherein the bipolar junction transistor, by way of the emitter and collector thereof, is connected in series in the circuit formed by the series-connected LED and switch unit, the base of the bipolar junction transistor is used for receiving an excitation signal, and the conducting direction of the LED (i.e. the direction from the positive terminal to the negative terminal of the LED) is the same as the direction from the emitter to the collector of the bipolar junction transistor. These solutions can realize query signal sending or receiving branches by a technically simple method, so that reliable and orderly transmission of DZSI signals between switches of different types can be achieved by simply making relatively small changes to existing zone selective interlocking devices used to transmit ZSI signals. It is also possible to inspect in real time the communication links between switches of different types, in order to discover communication link faults in the DZSI system promptly.

An embodiment of the present invention also provides a zone selective interlocking system based on the zone selective interlocking device described above, comprising a query switch and a non-query switch, wherein the non-query switch is connected to at least one query switch via a communication link.

Furthermore, an embodiment of the present invention also provides a communication method based on the zone selective interlocking system mentioned above, comprising: each switch performing the following steps: 1) a zone selective interlocking device of a non-query switch operates in the first mode, and a zone selective interlocking device of a query switch operates in the third mode; 2) when a fault which necessitates transmission of a zone selective interlocking signal is detected, the zone selective interlocking devices of the non-query switch and query switch both switch to operation in the second mode; 3) when it is detected that the fault which necessitated transmission of a zone selective interlocking signal has disappeared, return to step 1). By inspecting the current in the power distribution circuit it controls, a switch can determine whether a fault which necessitates transmission of a zone selective interlocking signal has occurred. For example, when the current in the power distribution circuit controlled by a switch is greater than a preset threshold, it can be determined that a short-delay short circuit current has occurred, at which point the switch needs to transmit a zone selective interlocking signal to another switch. In step 2), when a fault which necessitates transmission of a zone selective interlocking signal is detected, after waiting for a preset length of time to determine the present power supply direction, one of the first port and second port is set to be in the state of being connected to the input bus according to the present power supply direction so determined, while the other is set to be in the state of being connected to the output bus, so as to switch the zone selective interlocking device to operation in the second mode. At the same time as realizing reliable, orderly transmission of DZSI signals between switches of different types, the above communication method can make use of automatic inspection throughout the DZSI system to promptly discover communication link faults, including faults which occur in communication links connecting switches of different types; this enables erroneous DZSI signal exchange between switches of different types to be avoided. It is also possible to accurately determine the position of the occurrence of a communication link fault anywhere in the DZSI system, greatly facilitating equipment maintenance.

Furthermore, in one solution of an embodiment, a method for a query switch to automatically inspect communication links, based on the zone selective interlocking system mentioned above, is provided, the method comprising the following steps: 1) a zone selective interlocking device of a query switch operates in the third mode, and the first port and the second port are switched between different states in a regular pattern; 2) a judgment is made on whether a fault has occurred, based on a change in voltage or current in the query signal sending branch.

In another solution of an embodiment, a method for a non-query switch to automatically inspect communication links, based on the zone selective interlocking system mentioned above, is further provided, the method comprising the following steps: 1) a zone selective interlocking device of the non-query switch operates in the first mode, and the first port and the second port are switched between different states in a regular pattern according to a timeslot; 2) a judgment is made on whether a fault has occurred, based on a change in voltage or current in the query signal receiving branch. In step 2), a judgment is made on whether a fault of a specific type has occurred with reference to a change in voltage or current in the query signal receiving branch, first port and second port, wherein the fault of a specific type includes: reversed polarity, short circuit or open circuit in the link between the zone selective interlocking device of the query switch and the zone selective interlocking device of the non-query switch.

The method for automatic inspection of communication links described above can make use of automatic inspection to identify fault types in communication links, as well as enabling quick discovery of reversed polarity faults in communication links before switches are connected to the power distribution circuits controlled thereby, thereby avoiding economic loss.

To furnish a clearer understanding of the technical features, objects and effects of the present invention, particular embodiments thereof are now explained with reference to the accompanying drawings.

Figure 3:
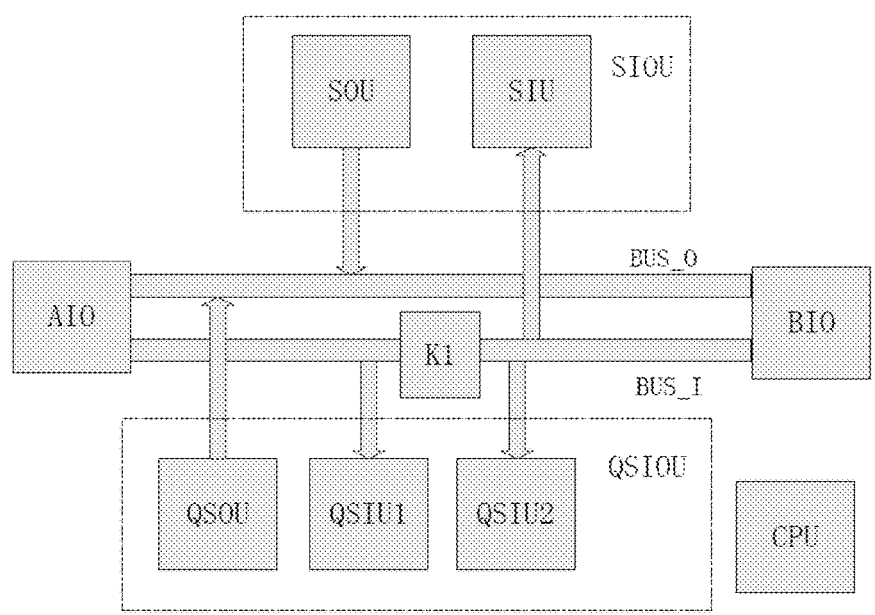
FIG. 3 shows a modular schematic diagram of a DZSI device in one embodiment of the present invention.

According to one embodiment of the present invention, a DZSI device for a switch is provided that is capable not only of realizing DZSI functionality but also of automatically inspecting a DZSI communication link. The DZSI device may be part of the trip unit of the switch. FIG. 3 shows a modular schematic diagram of the DZSI switch, comprising: an input bus BUS_I, an output bus BUS_O, a first input/output port AIO, a second input/output port BIO. The two ends of the input bus BUS_I are connected to the first input/output port AIO and the second input/output port BIO, respectively; the two ends of the output bus BUS_O are also connected to the first input/output port AIO and the second input/output port BIO, respectively. The first input/output port AIO and the second input/output port BIO both have a switching functionality, such that the input/output ports can be controlled to switch to a connection with the input bus BUS_I alone or a connection with the output bus BUS_O alone. Thus, the first input/output port AIO and the second input/output port BIO can be controlled to become input ports or output ports, in order to adapt to a change in the direction of transmission of DZSI signals.

Still referring to FIG. 3, the DZSI device also comprises a link inspection unit QSIOU, a DZSI signal transceiving unit SIOU and a CPU. The link inspection unit QSIOU comprises a query signal sending branch QSOU, a first query signal receiving branch QSIU1 and a second query signal receiving branch QSIU2. The query signal sending branch QSOU is connected to the output bus BUS_O. Provided on the input bus BUS_I is a first switch unit K1 which divides the input bus BUS_I into two sections; the first query signal receiving branch QSIU1 is connected to that section of the input bus BUS_I which is closer to the first input/output port AIO, while the second query signal receiving branch QSIU2 is connected to that section of the input bus BUS_I which is closer to the second input/output port BIO. The DZSI signal transceiving unit SIOU comprises a DZSI signal sending branch SOU and a DZSI signal receiving branch SIU, wherein the DZSI signal sending branch SOU is connected to the output bus BUS_O, while the DZSI signal receiving branch SIU is connected to the input bus BUS_I. The query signal sending branch QSOU, first query signal receiving branch QSIU1, second query signal receiving branch QSIU2, DZSI signal sending branch SOU and DZSI signal receiving branch SIU are each provided with a corresponding switch unit. The CPU is used to control the turning on/off of the respective switch units of the query signal sending branch QSOU, first query signal receiving branch QSIU1, second query signal receiving branch QSIU2, DZSI signal sending branch SOU and DZSI signal receiving branch SIU. The CPU is also used to control the turning on/off of the first switch unit K1, as well as the switching of the input/output ports between the input bus BUS_I and output bus BUS_O.

The DZSI device automatically inspects the DZSI communication links and realizes DZSI signal transmission according to the following workflow.

The DZSI device has two operating modes: a link inspection mode and a DZSI signal transceiving mode. In the link inspection mode, the CPU controls the first switch unit to turn off the input bus BUS_I, controls the appropriate switch units to turn off the DZSI signal sending branch and DZSI signal receiving branch, and controls the appropriate switch units to turn on the query signal sending branch, first query signal receiving branch and second query signal receiving branch. By determining whether the first query signal receiving branch has received a query signal (i.e. a link fault query signal), it can be determined whether the communication link connected to the first input/output port AIO is normal. By determining whether the second query signal receiving branch has received a query signal, it can be determined whether the communication link connected to the second input/output port BIO is normal. In particular, with regard to query switches, the CPU supplies an excitation signal to the query signal sending branch, and by setting the input/output ports to be input ports or output ports in different timeslots, arranges for a query signal to be sent to the first input/output port AIO and the second input/output port BIO in different timeslots. Generally, the two input/output ends of a query switch are both connected by a DZSI link to a non-query switch.

In the DZSI signal transceiving mode, the CPU controls the first switch unit to turn on the input bus BUS_I, controls the appropriate switch units to turn on the DZSI signal sending branch and DZSI signal receiving branch, and controls the appropriate switch units to turn off the query signal sending branch, first query signal receiving branch and second query signal receiving branch. The power supply direction at the present time is determined according to the principles of DZSI, and it is then possible to set the input/output ports to be input ports or output ports accordingly. DZSI signals can then be sent or received by means of the DZSI signal sending branch and DZSI signal receiving branch.

Figure 4:
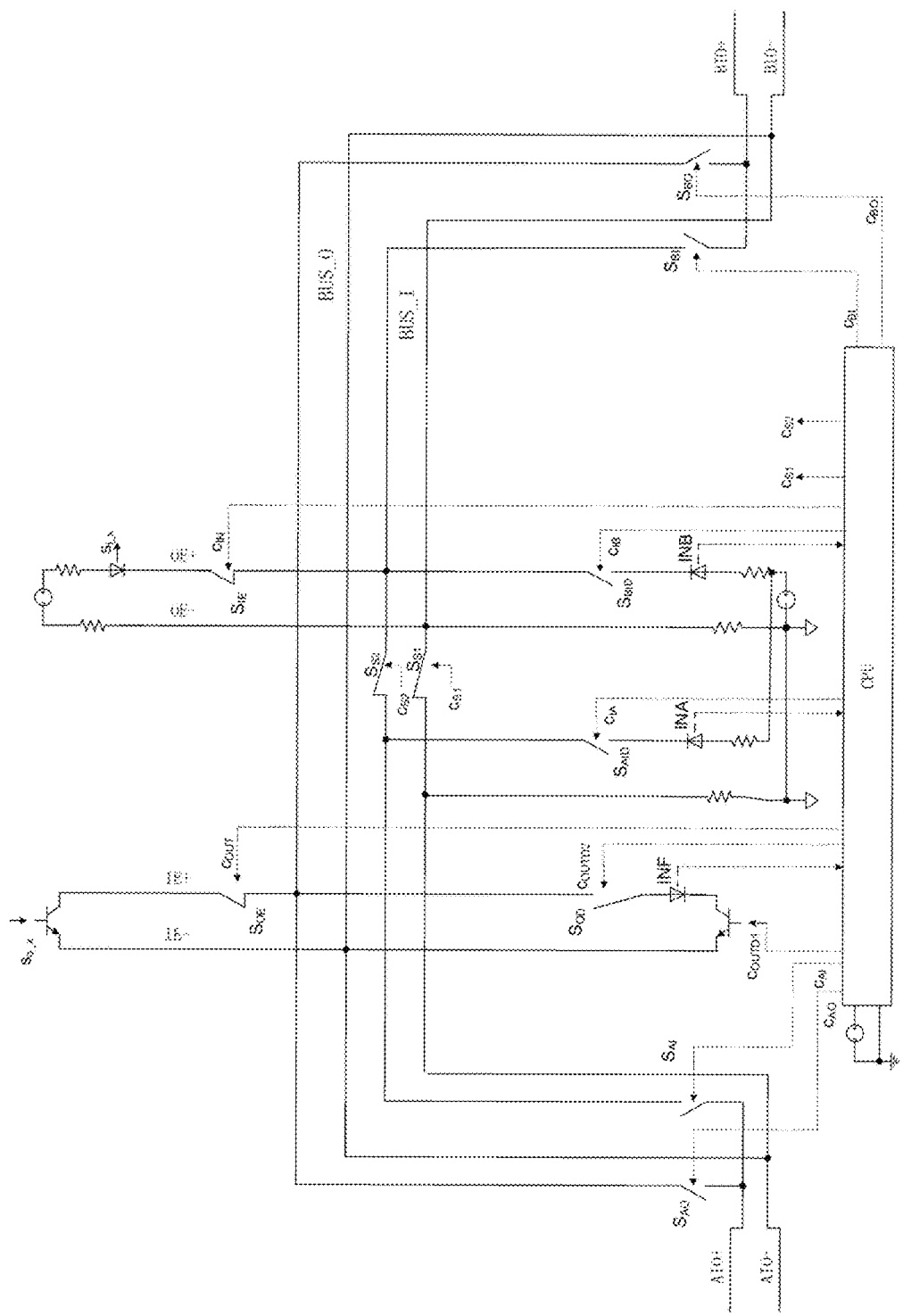
FIG. 4 shows a circuit diagram of a DZSI device in one embodiment of the present invention.
Figure 5:
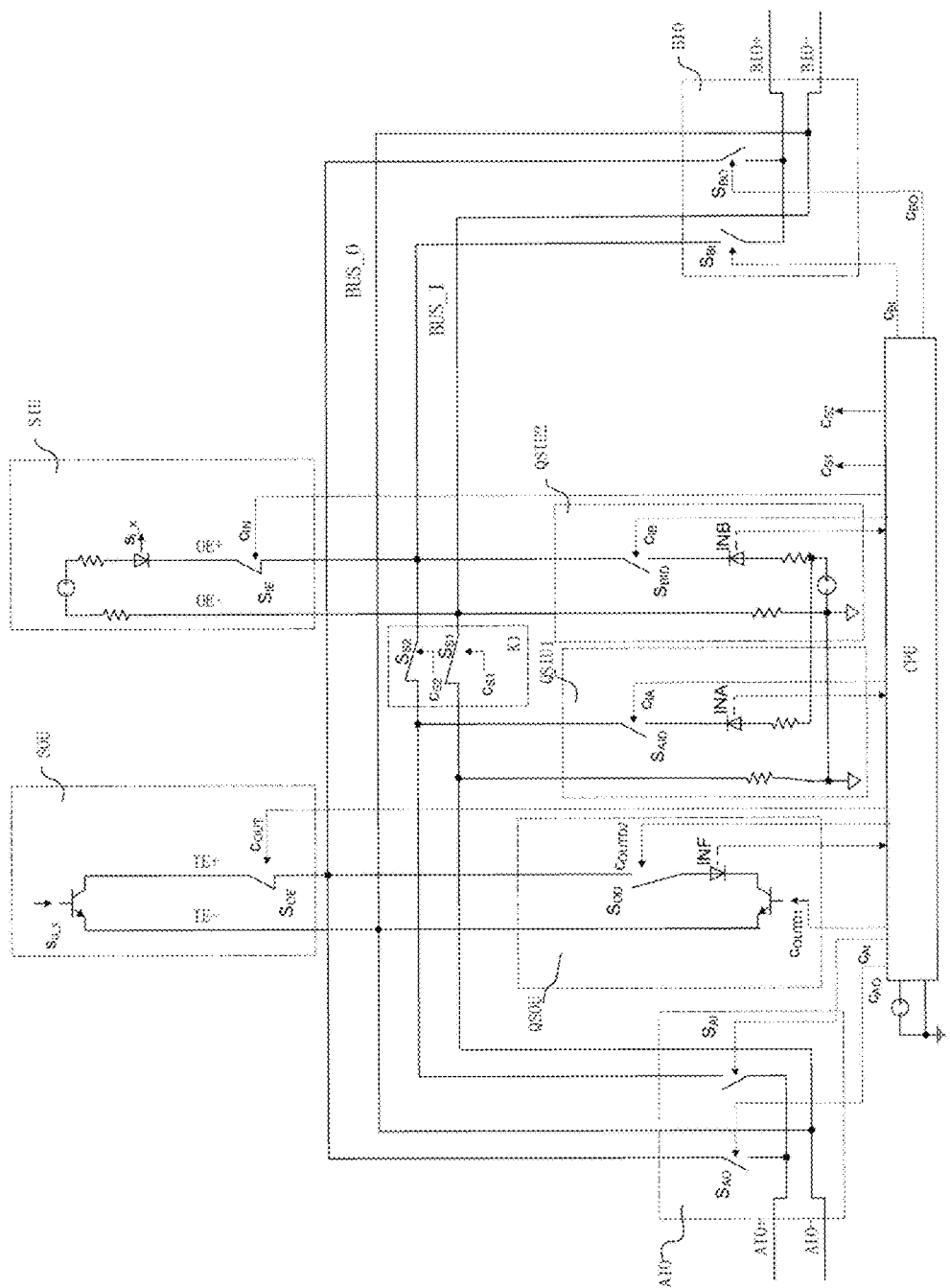
FIG. 5 shows a circuit diagram of a DZSI device obtained by marking the modules shown in FIG. 3 on the circuit diagram of FIG. 4.

Furthermore, FIG. 4 shows a circuit diagram based on the modular architecture of FIG. 3. It employs a technically simple method to realize modules such as the link inspection unit, DZSI signal transceiving unit, first input/output port AIO and second input/output port BIO. Such an implementation scheme only needs to make relatively small changes to an existing DZSI device in order to realize automatic inspection of a DZSI communication link and perform DZSI communication. To facilitate understanding, FIG. 5 shows a circuit diagram of a DZSI device obtained by marking the various modules shown in FIG. 3 on the circuit diagram of FIG. 4. Referring to FIGS. 4 and 5, the query signal sending branch comprises a bipolar junction transistor, a light-emitting diode (LED) and a switch unit SOD which are connected in series, wherein the emitter and collector of the bipolar junction transistor are connected to the query signal sending branch, the base is used for receiving an excitation signal COUTD1, and the directions in which the LED and bipolar junction transistor conduct are the same. The LED is generally used together with an optical receiver (e.g. a phototransistor), to form an optocoupler. An optocoupler may be used to detect whether the query signal sending branch is passing a current; a change in the light emission of the LED is identified by the optical receiver to give a corresponding identification signal INF which is then transmitted to the CPU. The first query signal receiving branch comprises a power supply (e.g. a voltage source), a current-limiting resistor, an LED and a switch unit SAID connected in series, while the second query signal receiving branch also comprises a power supply, a current-limiting resistor, an LED and a switch unit SBID, wherein the first query signal receiving branch and second query signal receiving branch may share the same power supply. The LED of the first query signal receiving branch may be used for detecting whether the first query signal receiving branch is passing a current; a change in the light emission of the LED is identified by a corresponding optical receiver to give a corresponding identification signal INA which is then transmitted to the CPU. The LED of the second query signal receiving branch may be used for detecting whether the second query signal receiving branch is passing a current; a change in the light emission of the LED is identified by a corresponding optical receiver to give a corresponding identification signal INB which is then transmitted to the CPU. The DZSI signal transceiving unit comprises a DZSI signal sending branch and a DZSI signal receiving branch. The DZSI signal sending branch comprises a bipolar junction transistor and a switch unit SOE which are connected in series, wherein the emitter and collector of the bipolar junction transistor are connected to the DZSI signal sending branch, while the base is used for receiving a DZSI signal So_x. The DZSI signal receiving branch comprises a power supply, a current-limiting resistor, an LED and a switch unit SIE which are connected in series, wherein the LED may be used for detecting whether the DZSI signal receiving branch is passing a current. A change in the light emission of the LED is identified by a corresponding optical receiver to give a corresponding identification signal Si_x; the identification signal Si_x is the received DZSI signal. In each of the branches mentioned above, the number of current-limiting resistors may be selected according to actual requirements, e.g. each branch may be designed to include two current-limiting resistors, so that power dissipation is distributed. A photodiode may be replace by another sensitive element capable of measuring changes in current or voltage. In addition, in the embodiment shown in FIG. 4, the input bus BUS_I comprises a negative lead and a positive lead; the two ends of the negative lead are connected to the respective negative poles of the input/output ports AIO and BIO, while the two ends of the positive lead are connected to the respective positive poles of the input/output ports AIO and BIO. The first switch unit comprises SS1 and SS2, which are used to control the turning on/off of the negative pole connection branch and positive pole connection branch of the input bus BUS_I. The output bus BUS_O also comprises a negative lead and a positive lead; the two ends of the negative lead are connected to the respective negative poles of the input/output ports AIO and BIO, while the two ends of the positive lead are connected to the respective positive poles of the input/output ports AIO and BIO.

Referring to the specific scenario of FIG. 1, the workflow, according to which the DZSI device of this embodiment realizes automatic inspection of a DZSI communication link and performs DZSI communication, is described further below.

FIG. 1 shows a typical mixed DZSI system, comprising ten switches CB (CB1, CB2, CB3, CB4, CB5, CB6, CB7, CB8, CB9 and CB10). Of these, the five switches CB1, CB2, CB3 CB4 and CB5 are Siemens 3WL ACBs, forming a 3WL ACB DZSI subsystem, while the other five switches CB6, CB7, CB8, CB9 and CB10 are Siemens SnG MCCBs, forming an SnG MCCB DZSI subsystem. Switches CB1, CB4, CB6 and CB9 are connected in series in that order to form a first power distribution branch, wherein switch CB1 is connected to a power supply device TM1, while switch CB9 is connected to an electrical device L1. Switches CB2, CB5, CB7 and CB10 are connected in series in that order to form a second power distribution branch, wherein switch CB2 is connected to a power supply device TM2, while CB10 is connected to an electrical device L2. Switch CB3 is disposed on a first bridge branch, one end of the first bridge branch being connected to the first power distribution device between switch CB1 and switch CB4, and the other end being connected to the second power distribution branch between switch CB2 and switch CB5. Switch CB8 is disposed on a second bridge branch, one end of the second bridge branch being connected to the first power distribution branch between switch CB6 and switch CB9, and the other end being connected to the second power distribution branch between switch CB7 and switch CB10. In FIG. 1, switches CB1, CB4 and CB3 together with DZSI communication links therebetween form a region 1; CB3, CB2 and CB5 together with DZSI communication links therebetween form a region 2; switches CB6, CB9, CB8, CB7 and CB10 together with DZSI communication links therebetween form a region 3. By "DZSI communication links" is meant the links which connect zone selective interlocking devices (i.e. ETU1, ETU2, ETU3, ETU4, ETU5, ETU6, ETU7, ETU8, ETU9 and ETU10) in the various switches. CB4, CB5 and CB8 are set to be query switches, while the remaining switches, i.e. CB1, CB2, CB3, CB6, CB7, CB9 and CB10 are set to be non-query switches. With this setting, there is one query switch in each region. Each non-query switch is connected to one query switch, to perform automatic inspection of each communication link between the query switch and the non-query switch, thereby enabling prompt discovery of communication link faults anywhere in the whole DZSI system.

Figure 6:
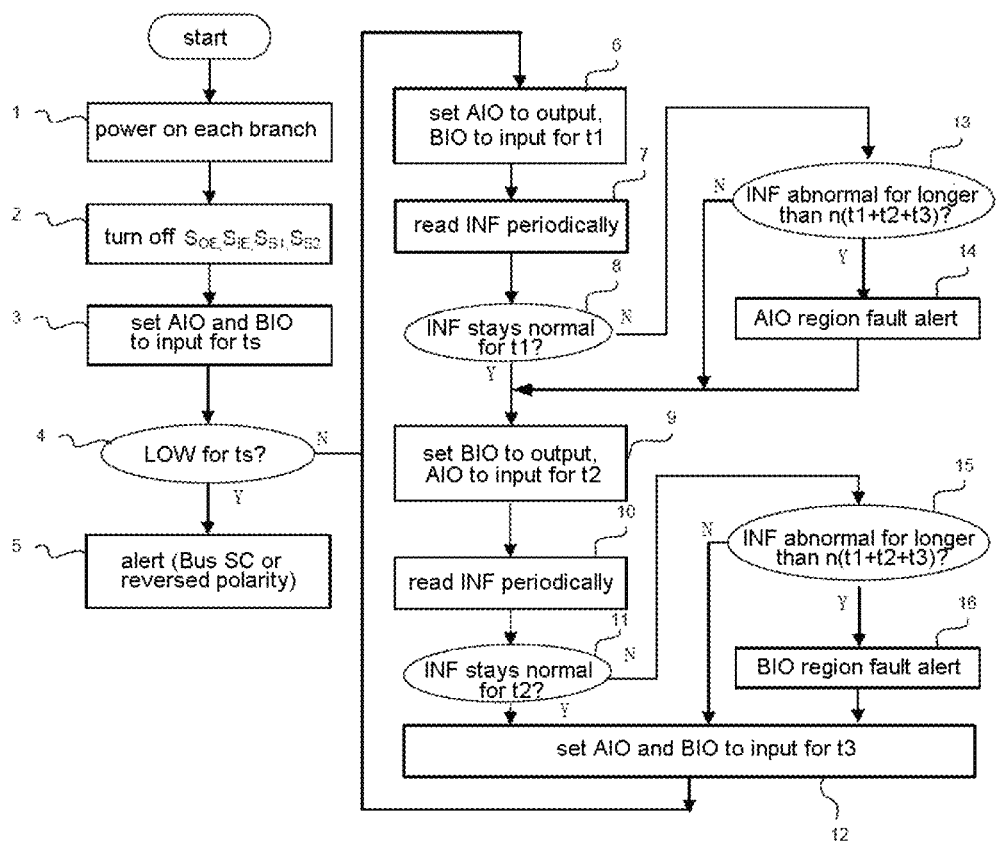
FIG. 6 shows a flow chart for a query switch in the link inspection mode in one embodiment of the present invention.

In the usual state, these query switches and non-query switches all operate in the link inspection mode. FIG. 6 shows a flow chart for the automatic inspection of the DZSI communication links by each query switch, based on the application scenario of FIG. 1. Referring to FIG. 6, the procedure for automatic inspection of DZSI communication links comprises the following steps, for each query switch:

Step 1: powering on the power supplies of the first query signal receiving branch and second query signal receiving branch.

Step 2: turning off switch units SOE, SIE, SS1 and SS2.

Step 3: setting both ports AIO and BIO to be input terminals for a time ts (e.g. 5 s). At this point, in the case of a pair of adjacent switches connected by a DZSI link, if the DZSI link is normal, query signal receiving branches of the pair of adjacent switches will form a complete circuit, so that the LEDs in the corresponding query signal receiving branches each emit a light signal which will be identified as HIGH. Taking the pair of switches CB4 and CB6 as an example, if the DZSI link between CB4 and CB6 is normal, then the second query signal receiving branch of CB4 is connected to the first query signal receiving branch of CB6 via the input bus BUS_I and port BIO of CB4, the DZSI link, and port AIO and input bus BUS_I of CB6, forming a complete circuit. This being the case, the power supply of the second query signal receiving branch of CB4 and the power supply of the first query signal receiving branch of CB6 form a series-connected structure, so that current flows through the LED in the second query signal receiving branch of CB4 and the LED in the first query signal receiving branch of CB6. These two LEDs each emit a light signal which can be identified as HIGH.

Step 4: detecting light signals from the LEDs of the two query signal receiving branches, determining whether there is a LOW level lasting ts seconds, and if so, performing step 5, otherwise performing step 6.

Step 5: issuing a DZSI link fault alert, wherein the fault is a short circuit or reversed polarity. When the DZSI link is a link connecting a query switch to a non-query switch, it can be determined directly that the fault is reversed polarity, i.e. the cables of the DZSI link connecting the two switches have been connected incorrectly to the positive and negative poles. If there is a LOW level lasting ts seconds in the LED of the first query signal receiving branch, then there is reversed polarity in the DZSI link at the AIO port side; if there is a LOW level lasting ts seconds in the LED of the second query signal receiving branch, then there is reversed polarity in the DZSI link on the BIO port side. Taking the pair of switches CB4 and CB6 as an example again, if there is reversed polarity in the DZSI link between CB4 and CB6, then in the circuit formed by the second query signal receiving branch of CB4 and the first query signal receiving branch of CB6 via the input bus BUS_I and port BIO of CB4, the DZSI link, and port AIO and input bus BUS_I of CB6, the power supply of the second query signal receiving branch of CB4 and the power supply of the first query signal receiving branch of CB6 have opposed positive and negative poles, which cancel each other out. Thus, neither the LED in the second query signal receiving branch of CB4 nor the LED in the first query signal receiving branch of CB6 emits light, and the corresponding light signal is identified as LOW. Thus, a LOW level lasting ts seconds can serve as the basis for issuing an alert for a DZSI link reversed polarity fault.

Step 6: setting port AIO to be an output port and port BIO to be an input port, and maintaining this state for a time t1.

Step 7: applying an excitation signal COUTD1 to the query signal output branch, and periodically reading a signal INF from the LED in the query signal output branch.

Step 8: determining whether the signal INF is normal for the duration of time t1, and if so, going on to perform step 9, otherwise performing step 13.

Step 9: setting port BIO to be an output port and port AIO to be an input port, and maintaining this state for a time t2.

Step 10: continuing to apply an excitation signal COUTD1 to the query signal output branch, and periodically reading a signal INF from the LED in the query signal output branch.

Step 11: determining whether the signal INF is normal for the duration of time t2, and if so, going on to perform step 12, otherwise performing step 15.

Step 12: setting both ports AIO and BIO to be input ports, and maintaining this state for a time t3. Then return to step 6.

Step 13: determining whether the time for which the signal INF is not normal is greater than a preset threshold, and if so, performing step 14, otherwise returning to step 9. In this step, the threshold may be n cycles, wherein one cycle is t1+t2+t3, and n is a preset coefficient threshold. By setting a threshold for the time for which the signal INF is not normal, misjudgments caused by disturbance from the external environment can be eliminated, thereby increasing the level of fault tolerance.

Step 14: issuing an alert for a fault in the region of port AIO. When the signal INF is not normal for an extended period of time, this indicates that it has not been possible to send out a query signal in a predetermined direction (i.e. in the direction of the region of port AIO) successfully, in which case it can be determined that there is a fault in the region of port AIO, i.e. there is a fault in the DZSI link connected to port AIO. Once the alert has been issued for a fault in the region of port AIO, return to step 9.

Step 15: determining whether the length of time for which the signal INF is not normal is greater than n cycles, and if so, performing step 16, otherwise returning to step 12.

Step 16: issuing an alert for a fault in the region of port BIO. When the signal INF is not normal for an extended period of time, this indicates that it has not been possible to send out a query signal in a predetermined direction (i.e. in the direction of the region of port BIO) successfully, in which case it can be determined that there is a fault in the region of port BIO, i.e. there is a fault in the DZSI link connected to port BIO. Once the alert has been issued for a fault in the region of port BIO, return to step 12.

Based on steps 1 to 16 above, it is possible to cyclically check for the existence of faults in the DZSI links connected to the two input/output ports AIO and BIO of a query switch in real time.

Figure 7:
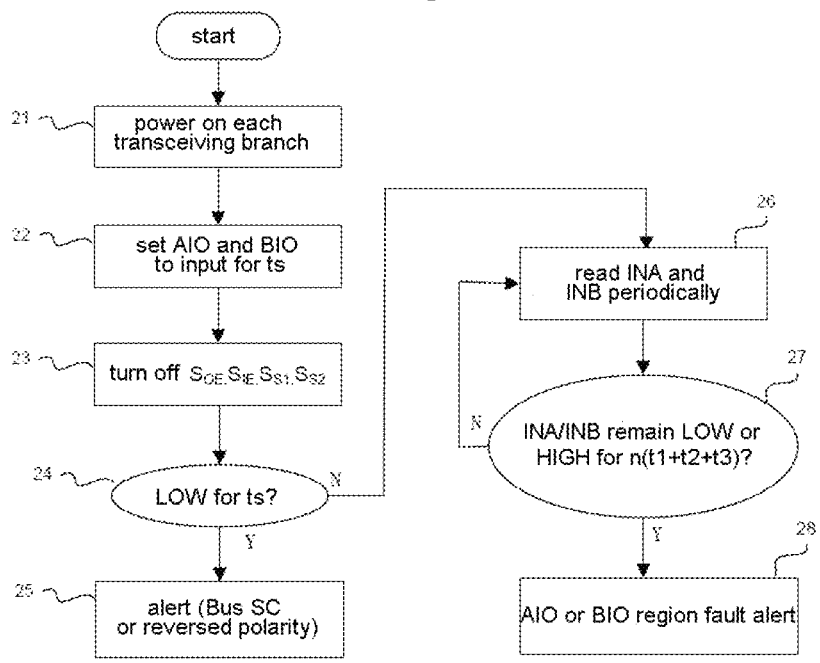
FIG. 7 shows a flow chart for a non-query switch in the link inspection mode in one embodiment of the present invention.

FIG. 7 shows a flow chart for the automatic inspection of DZSI communication links by each non-query switch, based on the application scenario of FIG. 1. Referring to FIG. 7, the procedure for automatic inspection of DZSI communication links comprises the following steps, for each non-query switch:

Step 21: powering on the power supplies of the first query signal receiving branch and second query signal receiving branch.

Step 22: turning off switch units SOE, SIE, SS1 and SS2.

Step 23: setting both ports AIO and BIO to be input terminals and maintaining this state for a time ts (e.g. 5 s).

Step 24: detecting light signals from the LEDs of the two query signal receiving branches, determining whether there is a LOW level lasting ts seconds, and if so, performing step 25, otherwise performing step 26.

Step 25: issuing an alert for a DZSI link fault, wherein the fault is a short circuit or reversed polarity. When the DZSI link is a link connecting a query switch to a non-query switch, it can be directly determined that the fault is reversed polarity, i.e. the cables of the DZSI link connecting the two switches have been connected incorrectly to the positive and negative poles. The principles by which a fault alert is issued are the same as in step 5 in the procedure for automatic inspection by a query switch as described above, and are not repeated here.

Step 26: reading a signal INA from the LED in the first query signal receiving branch and a signal INB from the LED in the second query signal receiving branch.

Step 27: determining whether the signal INA/INB remains at a LOW or a HIGH level for n cycles, and if so, performing step 28, otherwise returning to step 26. Here, one cycle is t1+t2+t3, while n is a preset coefficient threshold.

Step 28: issuing an alert for a fault in the region of port AIO/BIO, i.e. there is a fault in the DZSI link connected to port AIO/BIO. Specifically, if signal INA remains at a LOW or a HIGH level for n cycles, this indicates that the first query signal receiving branch has been unable to receive a query signal from port AIO normally, therefore an alert is issued for a fault in the region of port AIO. If signal INB remains at a LOW or a HIGH level for n cycles, this indicates that the second query signal receiving branch has been unable to receive a query signal from port BIO normally, therefore an alert is issued for a fault in the region of port BIO.

Based on steps 21 to 28 above, it is possible to cyclically check for the existence of faults in the DZSI links connected to the two input/output ports AIO and BIO of a non-query switch in real time.

Figure 8:
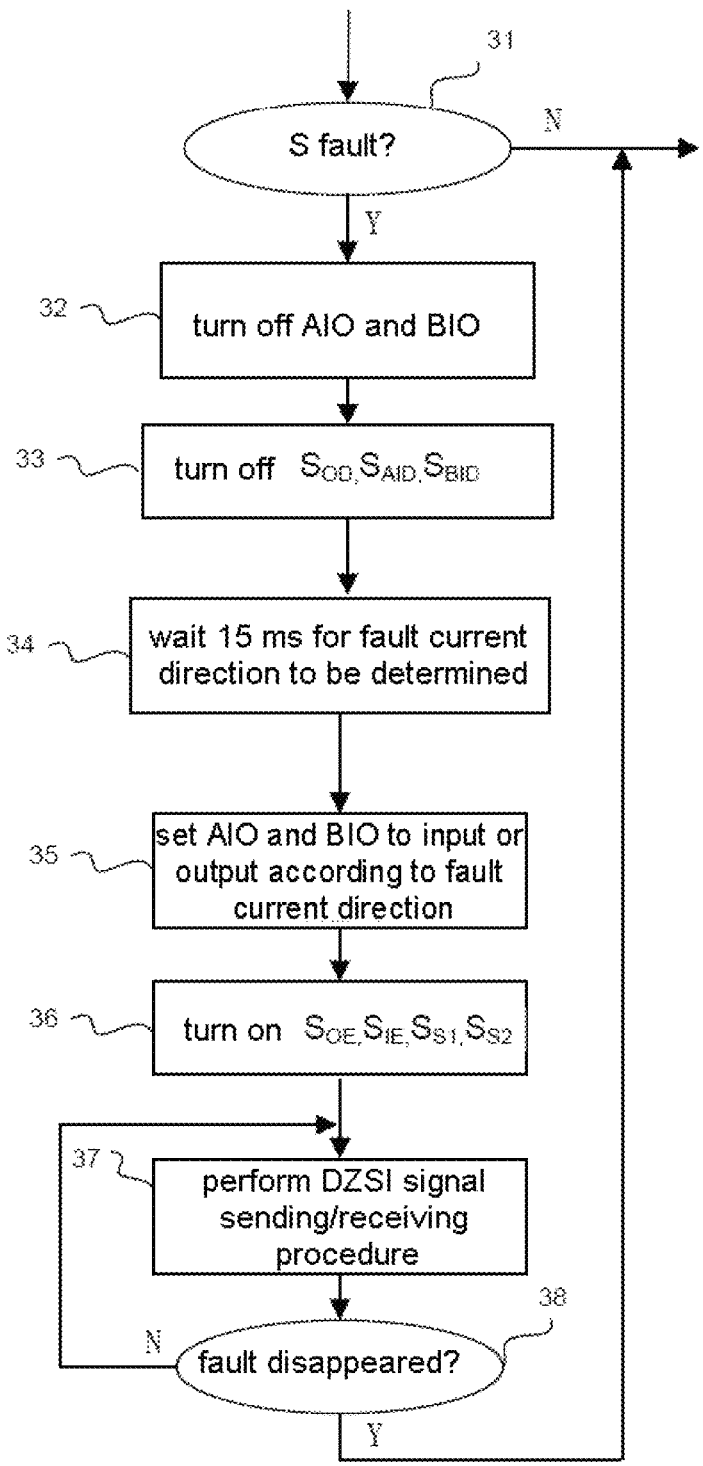
FIG. 8 shows a flow chart for a switch in the DZSI signal transceiving mode in one embodiment of the present invention.

In a DZSI system, when it is detected at a switch that the power distribution circuit has developed a fault which necessitates the transmission of a DZSI signal, e.g. a short circuit in the power distribution circuit (S fault), and a short-delay short circuit signal needs to be transmitted, then each switch in the DZSI system changes to the DZSI signal transceiving mode; once the short-delay short circuit fault has disappeared, each switch changes back to the link inspection mode. FIG. 8 shows a flow chart for DZSI signal transceiving by each switch (including query switches and non-query switches). Referring to FIG. 8, the procedure for DZSI signal transceiving by any switch comprises the following steps:

Step 31: determining whether an S fault signal has been received, and if so, performing step 32, otherwise continuing to operate in the link inspection mode.

Step 32: turning off ports AIO and BIO.

Step 33: turning off switch units SOD, SAID and SBID.

Step 34: delaying for a certain time (e.g. 15 ms), to wait for the fault current direction to be determined.

Step 35: setting ports AIO and BIO to be an input or output port according to the fault current direction, so that a DZSI signal is transmitted in the correct feed direction.

Step 36: turning on switch units SOE, SIE, SS1 and SS2.

Step 37: performing the procedure for DZSI signal sending or receiving. The procedure for DZSI signal sending or receiving is the same as that disclosed in the prior Siemens application 2013P03062CN, and is only described briefly here. With regard to the fault current direction, the DZSI signal sending branch of a downstream switch is connected to the DZSI signal receiving branch of an upstream switch via the output bus BUS_O of the downstream switch, the downstream switch's AIO or BIO which has been set to be an output port, the upstream switch's AIO or BIO which has been set to be an input port, and the input bus BUS_I of the upstream switch, to form a complete circuit. Thus a DZSI signal So_x that is applied to the base of the bipolar junction transistor in the DZSI signal sending branch of the downstream switch is converted to a light signal Si_x from the LED in the DZSI signal receiving branch of the upstream switch, and the light signal Si_x is read out by the upstream switch, thereby realizing transmission of the DZSI signal from the downstream switch to the upstream switch.

Step 38: once the S fault has disappeared, changing to the link inspection mode. Generally, based on DZSI signal transmission, the DZSI system will selectively turn off the appropriate switch, to make the S fault disappear, at which point each switch in the DZSI system goes back to operating in the link inspection mode, i.e. query switches continue to perform steps 1 to 16 above, while non-query switches continue to perform steps 21 to 28 above.

Figure 9:
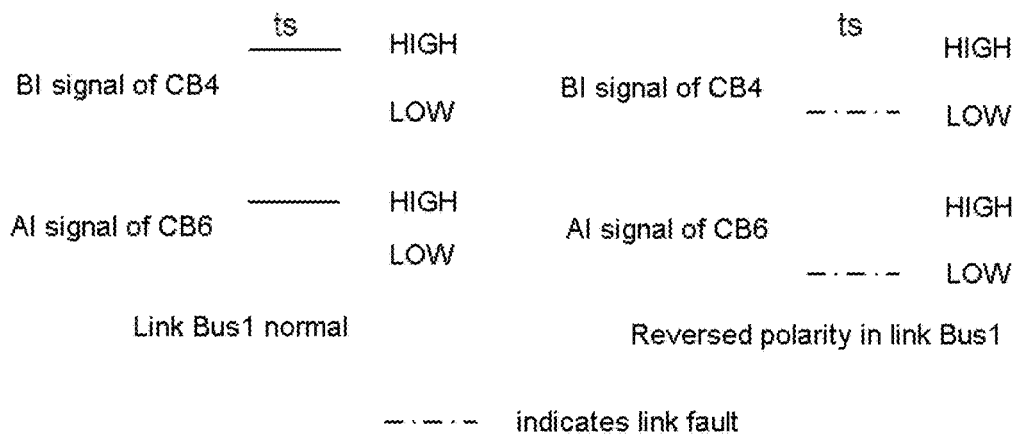
FIG. 9 shows the signal combinations corresponding to the situations where the DZSI link connecting switches CB4 and CB6 is normal, and connected with reversed polarity, respectively, based on the scenario of FIG. 1.
Figure 10:
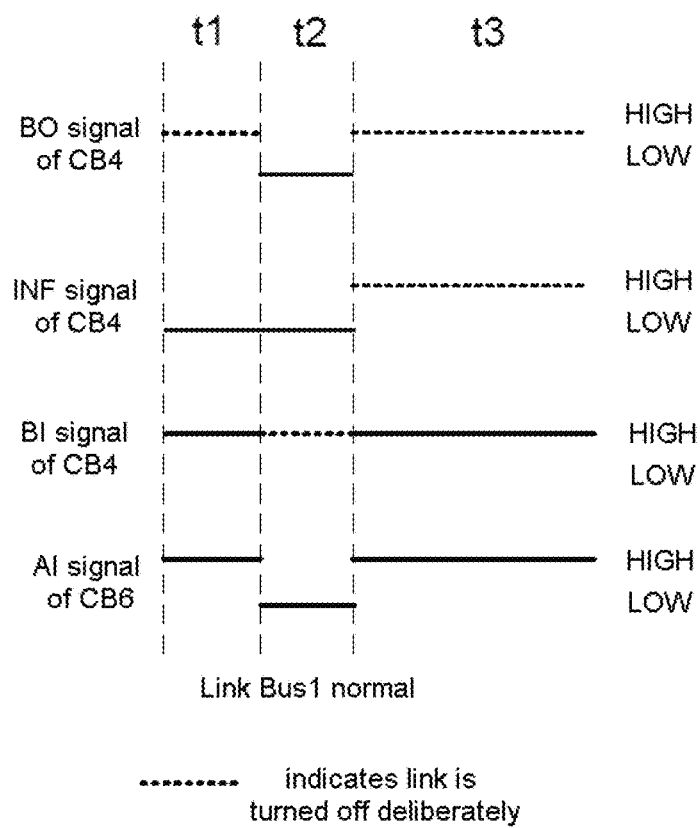
FIG. 10 shows the waveform combination of the relevant signals in the case where the DZSI link connecting switches CB4 and CB6 is normal, based on the scenario of FIG. 1.
Figure 11:
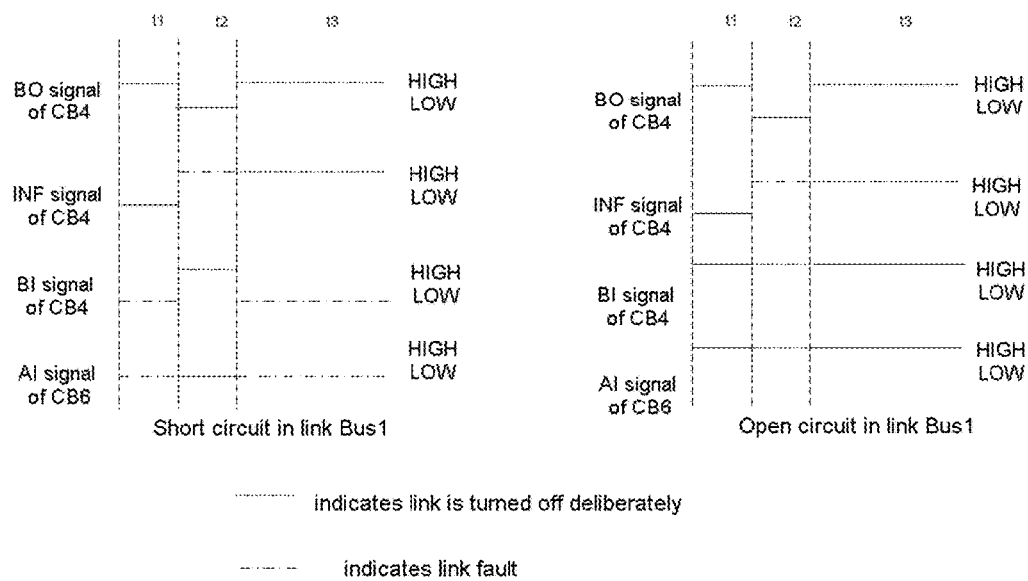
FIG. 11 shows the waveform combinations of the relevant signals in the cases where the DZSI link connecting switches CB4 and CB6 has a short circuit and open circuit, respectively, based on the scenario of FIG. 1.

Furthermore, based on the mixed DZSI system of FIG. 1, taking switches CB4 and CB6 as an example, FIG. 9 shows the signal combinations corresponding to the situations where the DZSI link connecting switches CB4 and CB6 is normal, and connected with reversed polarity, respectively, wherein the BI signal of CB4 refers to a signal in the case where port BIO of CB4 serves as an input port, while the AI signal of CB6 refers to a signal in the case where port AIO of CB6 serves as an input port. FIG. 10 shows the waveform combination of the relevant signals in the case where the DZSI link BUS1 connecting switches CB4 and CB6 is normal. FIG. 11 shows the waveform combinations of the relevant signals in the cases where the DZSI link BUS1 connecting switches CB4 and CB6 has a short circuit and open circuit, respectively. Based on the waveform combinations shown in FIG. 11, it is possible to precisely determine various types of fault in the link inspection mode (e.g. short circuit fault and open circuit fault).

In summary, in a mixed DZSI system, each query switch and non-query switch operates according to its own corresponding automatic inspection procedure, thereby enabling prompt discovery of communication link faults, including faults which occur in communication links connecting switches of different types; this enables erroneous DZSI signal exchange between switches of different types to be avoided. At the same time, the DZSI device and corresponding automatic inspection scheme in the above embodiment also enable the position of occurrence of a communication link fault anywhere in the DZSI system, as well as the type of fault, to be determined accurately. This greatly facilitates equipment maintenance.

Figure 12:
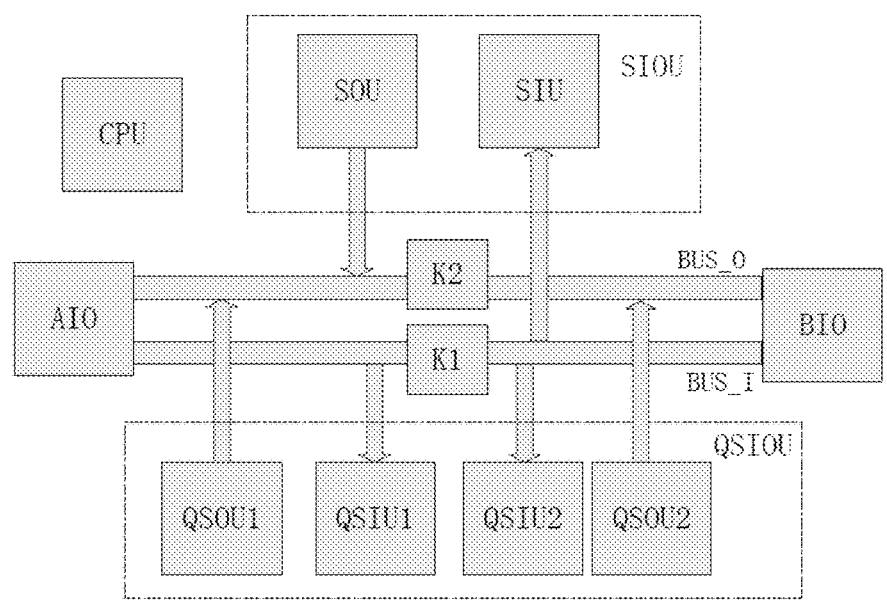
FIG. 12 shows a modular schematic diagram of a DZSI device in another embodiment of the present invention.

Another embodiment of the present invention is outlined below with reference to the accompanying drawings. FIG. 12 shows a modular schematic diagram of the DZSI device in another embodiment; compared with the embodiment of FIG. 3, this embodiment has a switch unit K2 added to the output bus BUS_O, while there are also two query signal sending branches QSOU1 and QSOU2. The two query signal sending branches QSOU1 and QSOU2 are connected to the output bus BUS_O on the two sides of the switch unit K2, i.e. the switch unit K2 divides the output bus BUS_O into two sections. The first query signal sending branch QSOU1 is connected to that section of the output bus BUS_O which is closer to the first input/output port AIO, while the second query signal sending branch QSOU2 is connected to that section of the output bus BUS_O which is closer to the second input/output port BIO. The remaining modules of the DZSI device of this embodiment, as well as the connection relationships among modules, are the same as in the embodiment of FIG. 3, and are not repeated here.

Figure 13:
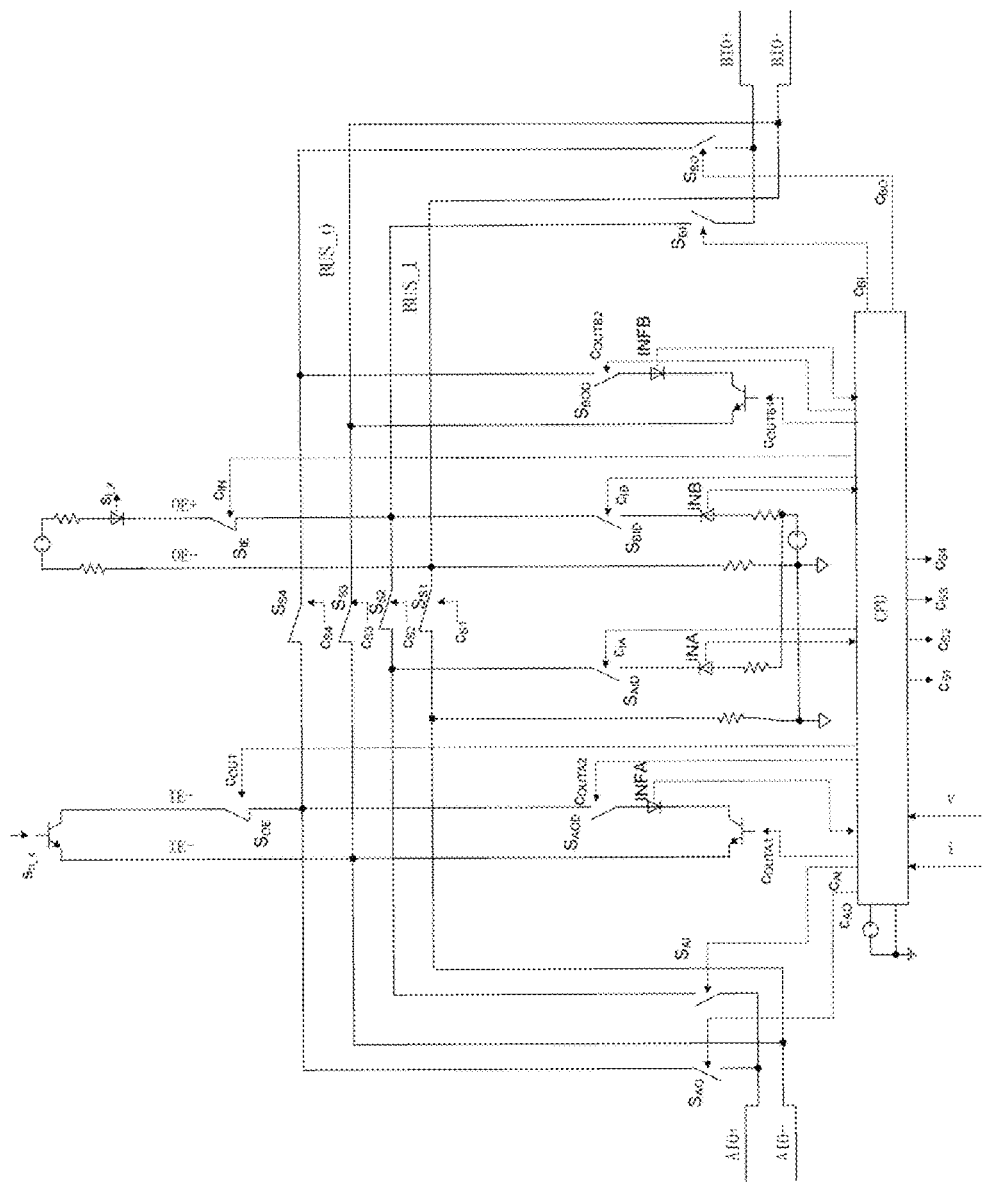
FIG. 13 shows a circuit diagram based on the modular architecture of FIG. 12 in another embodiment of the present invention.

Furthermore, FIG. 13 shows a circuit diagram based on the modular architecture of FIG. 12. It employs a technically simple method to realize the various modules in FIG. 12. Such an implementation scheme only needs to make relatively small changes to an existing DZSI device in order to realize automatic inspection of a DZSI communication link and perform DZSI communication. To facilitate understanding, FIG. 14 shows a circuit diagram of a DZSI device obtained by marking the various modules shown in FIG. 12 on the circuit diagram of FIG. 13.

Figure 14:
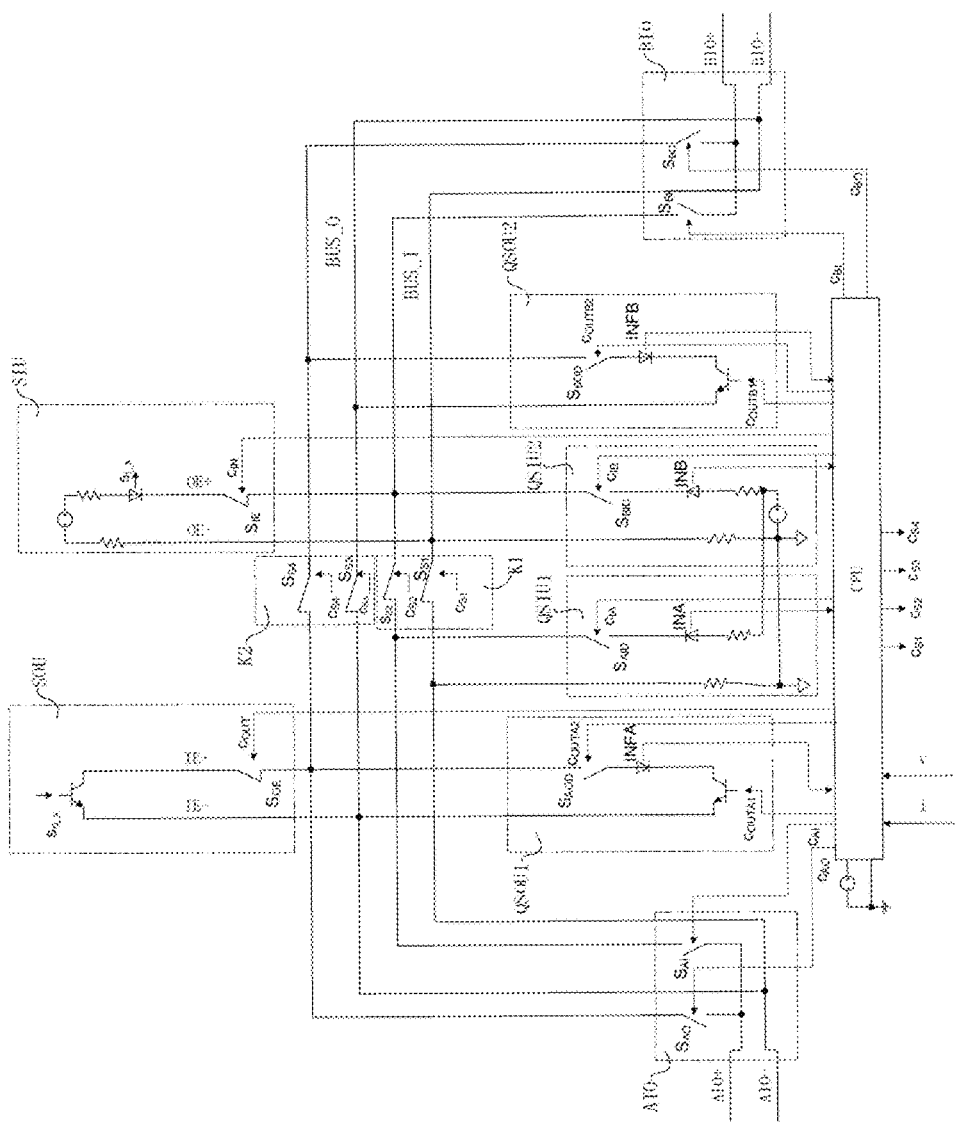
FIG. 14 shows a circuit diagram of a DZSI device obtained by marking the various modules shown in FIG. 12 on the circuit diagram of FIG. 13 in another embodiment of the present invention.

Referring to FIGS. 13 and 14, the first query signal sending branch comprises a bipolar junction transistor, an LED and a switch unit SAOD which are connected in series, wherein the emitter and collector of the bipolar junction transistor are connected to the first query signal sending branch, while the base is used for receiving an excitation signal COUTA1. The LED may be used to detect whether the query signal sending branch is passing a current; a change in the light emission of the LED is converted to give a corresponding identification signal INFA which is then transmitted to the CPU. The second query signal sending branch comprises a bipolar junction transistor, an LED and a switch unit SBOD which are connected in series, wherein the emitter and collector of the bipolar junction transistor are connected to the second query signal sending branch, while the base is used for receiving an excitation signal COUTB1. The LED may be used to detect whether the query signal sending branch is passing a current; a change in the light emission of the LED is converted to give a corresponding identification signal INFB which is then transmitted to the CPU. The first query signal receiving branch comprises a power supply, a current-limiting resistor, an LED and a switch unit SAID which are connected in series, while the second query signal receiving branch comprises a power supply, a current-limiting resistor, an LED and a switch unit SBID which are connected in series, wherein the first query signal receiving branch and second query signal receiving branch may share the same power supply. The LED of the first query signal receiving branch may be used for detecting whether the first query signal receiving branch is passing a current; a change in the light emission of the LED is converted to give a corresponding identification signal INA which is then transmitted to the CPU. The LED of the second query signal receiving branch may be used for detecting whether the second query signal receiving branch is passing a current; a change in the light emission of the LED is converted to give a corresponding identification signal INB which is then transmitted to the CPU. The DZSI signal transceiving unit comprises a DZSI signal sending branch and a DZSI signal receiving branch. The DZSI signal sending branch comprises a bipolar junction transistor and a switch unit SOE which are connected in series, wherein the emitter and collector of the bipolar junction transistor are connected to the DZSI signal sending branch, while the base is used for receiving a DZSI signal So_x. The DZSI signal receiving branch comprises a power supply, a current-limiting resistor, an LED and a switch unit SIE which are connected in series, wherein the LED may be used for detecting whether the DZSI signal receiving branch is passing a current. A change in the light emission of the LED is converted to give a corresponding identification signal Si_x; the identification signal Si_x is the received DZSI signal. In addition, in the embodiment of FIG. 13, the input bus BUS_I comprises a negative pole connection branch and a positive pole connection branch; the two ends of the negative pole connection branch are connected to the respective negative poles of the input/output ports AIO and BIO, while the two ends of the positive pole connection branch are connected to the respective positive poles of the input/output ports AIO and BIO. The first switch unit K1 comprises SS1 and SS2, which are used to control the turning on/off of the negative pole connection branch and positive pole connection branch of the input bus BUS_I. The second switch unit K2 comprises SS3 and SS4, which are used to control the turning on/off of the negative pole connection branch and positive pole connection branch of the output bus BUS_O.

Referring to the specific scenario of FIG. 1, the workflow according to which the DZSI device of this embodiment realizes automatic inspection of a DZSI communication link and performs DZSI communication is described further below. In the mixed DZSI system of FIG. 1, the query switches and non-query switches are arranged in exactly the same way as in the embodiment of FIG. 3, and are not repeated here.

Figure 15:
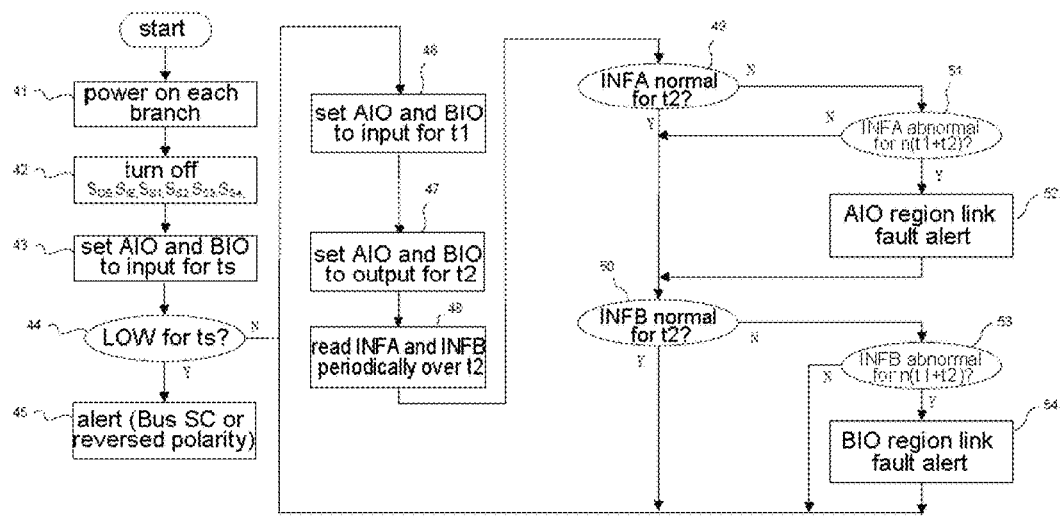
FIG. 15 shows a flow chart for the automatic inspection of DZSI communication links by each query switch, based on the application scenario of FIG. 1, in another embodiment of the present invention.

In the usual state, the query switches and non-query switches all operate in the link inspection mode. FIG. 15 shows a flow chart for the automatic inspection of the DZSI communication links by each query switch, based on the application scenario of FIG. 1. Referring to FIG. 15, the procedure for automatic inspection of DZSI communication links comprises the following steps, for each query switch:

Step 41: powering on the power supplies of the first query signal receiving branch and second query signal receiving branch.

Step 42: turning off switch units SOE, SIE, SS1, SS2, SS3 and SS4.

Step 43: setting both ports AIO and BIO to be input terminals for a time is (e.g. 5 s). At this point, in the case of a pair of adjacent switches connected by a DZSI link, if the DZSI link is normal, query signal receiving branches of the pair of adjacent switches will form a complete circuit, so that the LEDs in the corresponding query signal receiving branches each emit a light signal which will be identified as HIGH. Taking the pair of switches CB4 and CB6 as an example, if the DZSI link between CB4 and CB6 is normal, then the second query signal receiving branch of CB4 is connected to the first query signal receiving branch of CB6 via the input bus BUS_I and port BIO of CB4, the DZSI link, and port AIO and input bus BUS_I of CB6, forming a complete circuit. This being the case, the power supply of the second query signal receiving branch of CB4 and the power supply of the first query signal receiving branch of CB6 form a series-connected structure, so that current flows through the LED in the second query signal receiving branch of CB4 and the LED in the first query signal receiving branch of CB6. These two LEDs each emit a light signal which can be identified as HIGH.

Step 44: detecting light signals from the LEDs of the two query signal receiving branches, determining whether there is a LOW level lasting ts seconds, and if so, performing step 45, otherwise performing step 46.

Step 45: issuing a DZSI link fault alert, wherein the fault is a short circuit or reversed polarity. When the DZSI link is a link connecting a query switch to a non-query switch, it can be determined directly that the fault is reversed polarity, i.e. the cables of the DZSI link connecting the two switches have been connected incorrectly to the positive and negative poles. If there is a LOW level lasting ts seconds in the LED of the first query signal receiving branch, then there is reversed polarity in the DZSI link at the AIO port side; if there is a LOW level lasting ts seconds in the LED of the second query signal receiving branch, then there is reversed polarity in the DZSI link on the BIO port side. Taking the pair of switches CB4 and CB6 as an example again, if there is reversed polarity in the DZSI link between CB4 and CB6, then in the circuit formed by the second query signal receiving branch of CB4 and the first query signal receiving branch of CB6 via the input bus BUS_I and port BIO of CB4, the DZSI link, and port AIO and input bus BUS_I of CB6, the power supply of the second query signal receiving branch of CB4 and the power supply of the first query signal receiving branch of CB6 have opposed positive and negative poles, which cancel each other out. Thus, neither the LED in the second query signal receiving branch of CB4 nor the LED in the first query signal receiving branch of CB6 emits light, and the corresponding light signal is identified as LOW. Thus, a LOW level lasting ts seconds can serve as the basis for issuing an alert for a DZSI link reversed polarity fault.

Step 46: setting both ports AIO and BIO to be input ports, and maintaining this state for a time t1.

Step 47: setting both ports AIO and BIO to be output ports, applying an excitation signal COUTA1 to the first query signal output branch, and applying an excitation signal COUTB1 to the second query signal output branch.

Step 48: periodically reading a signal INFA from the LED in the first query signal output branch and a signal INFB from the LED in the second query signal output branch.

Step 49: determining whether the signal INFA is normal for the duration of a time t2, and if so, going on to perform step 50, otherwise performing step 51.

Step 50: determining whether the signal INFB is normal for the duration of time t2, and if so, returning to step 46, otherwise performing step 53.

Step 51: determining whether the time for which the signal INFA is not normal is greater than a preset threshold, and if so, performing step 52, otherwise performing step 50 directly. In this step, the threshold may be n cycles, wherein one cycle is t1+t2, and n is a preset coefficient threshold. By setting a threshold for the time for which the signal INF is not normal, misjudgments caused by disturbance from the external environment can be eliminated, thereby increasing the level of fault tolerance in link inspection.

Step 52: issuing an alert for a link fault in the region of AIO. Then go to step 50.

Step 53: determining whether the time for which the signal INFB is not normal is greater than a preset threshold, and if so, performing step 54, otherwise returning to step 46 directly. In this step, the threshold may be n cycles, wherein one cycle is t1+t2, and n is a preset coefficient threshold.

Step 54: issuing an alert for a link fault in the region of BIO. Return to step 46.

Based on steps 41 to 54 above, it is possible to cyclically check for the existence of faults in the DZSI links connected to the two input/output ports AIO and BIO of a query switch in real time.

Figure 16:
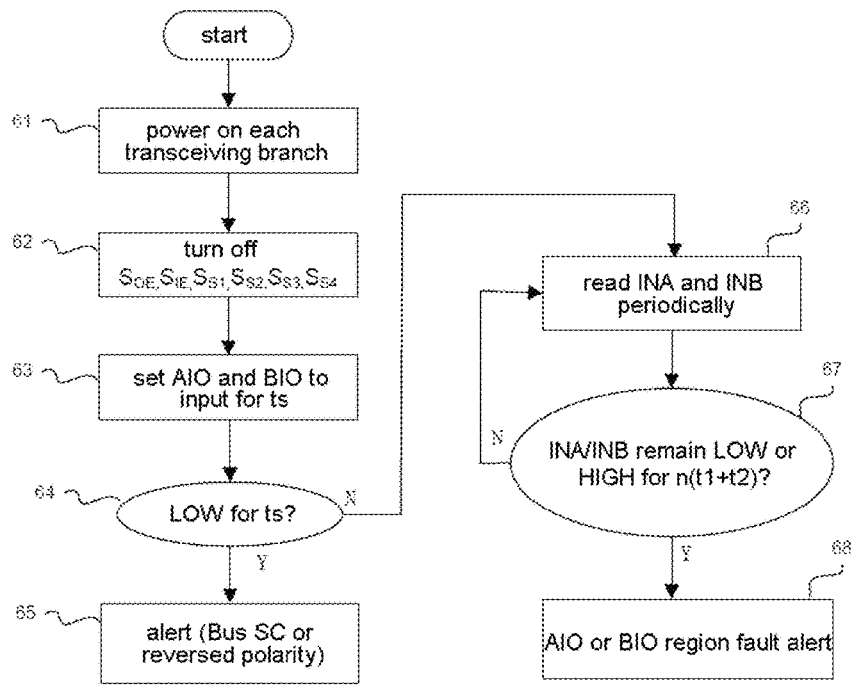
FIG. 16 shows a flow chart for the automatic inspection of DZSI communication links by each non-query switch, based on the application scenario of FIG. 1, in another embodiment of the present invention.

FIG. 16 shows a flow chart for the automatic inspection of DZSI communication links by each non-query switch, based on the application scenario of FIG. 1. Referring to FIG. 16, the procedure for automatic inspection of DZSI communication links comprises the following steps, for each non-query switch:

Step 61: powering on the power supplies of the first query signal receiving branch and second query signal receiving branch.

Step 62: turning off switch units SOE, SIE, SS1, SS2, SS3 and SS4.

Step 63: setting both ports AIO and BIO to be input terminals and maintaining this state for a time ts (e.g. 5 s).

Step 64: detecting light signals from the LEDs of the two query signal receiving branches, determining whether there is a LOW level lasting ts seconds, and if so, performing step 65, otherwise performing step 66.

Step 65: issuing an alert for a DZSI link fault, wherein the fault is a short circuit or reversed polarity. When the DZSI link is a link connecting a query switch to a non-query switch, it can be directly determined that the fault is reversed polarity, i.e. the cables of the DZSI link connecting the two switches have been connected incorrectly to the positive and negative poles. The principles by which a fault alert is issued are the same as in step 45 in the procedure for automatic inspection by a query switch as described above, and are not repeated here.

Step 66: reading a signal INA from the LED in the first query signal receiving branch and a signal INB from the LED in the second query signal receiving branch.

Step 67: determining whether the signal INA/INB remains at a LOW or a HIGH level for n cycles, and if so, performing step 68, otherwise returning to step 66. Here, one cycle is t1+t2, while n is a preset coefficient threshold.

Step 68: issuing an alert for a fault in the region of port AIO/BIO, i.e. there is a fault in the DZSI link connected to port AIO/BIO. Specifically, if signal INA remains at a LOW or a HIGH level for n cycles, this indicates that the first query signal receiving branch has been unable to receive a query signal from port AIO normally, therefore an alert is issued for a fault in the region of port AIO. If signal INB remains at a LOW or a HIGH level for n cycles, this indicates that the second query signal receiving branch has been unable to receive a query signal from port BIO normally, therefore an alert is issued for a fault in the region of port BIO.

Based on steps 61 to 68 above, it is possible to cyclically check for the existence of faults in the DZSI links connected to the two input/output ports AIO and BIO of a non-query switch in real time.

Figure 17:
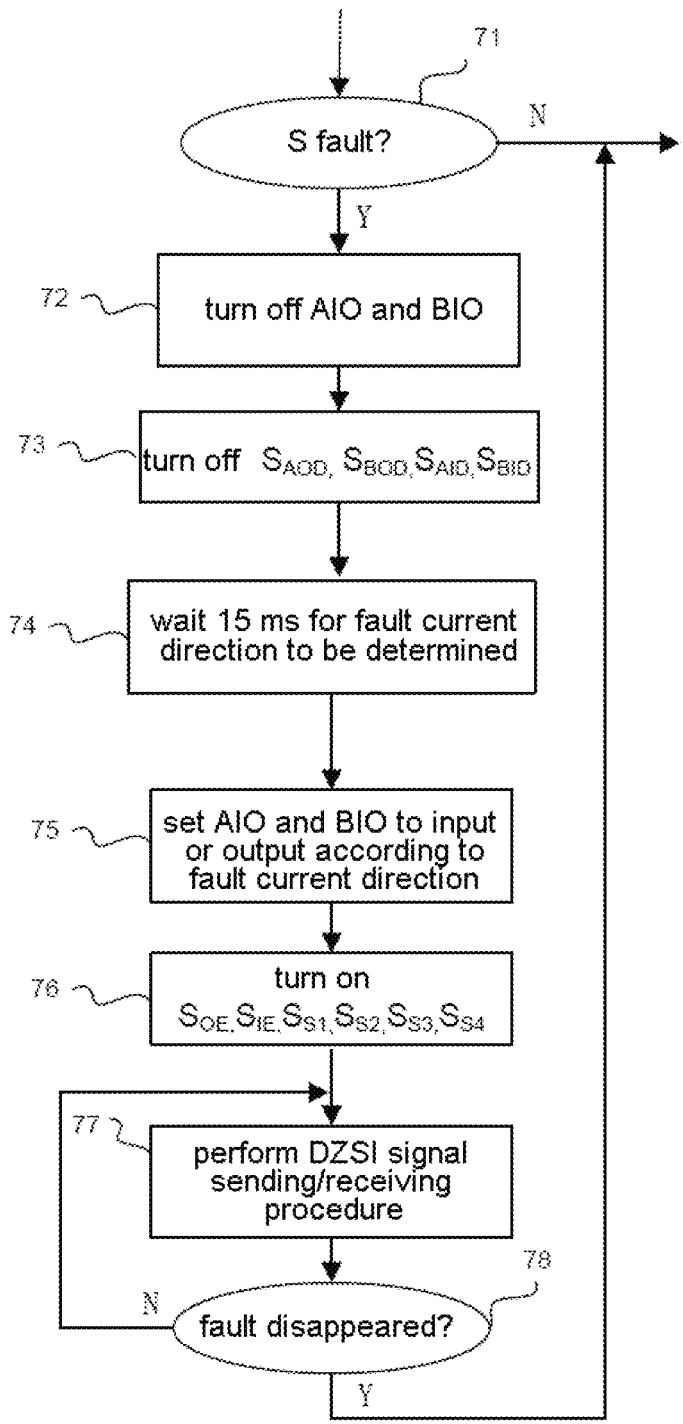
FIG. 17 shows a flow chart for DZSI signal transceiving by each switch in another embodiment of the present invention.

In a DZSI system, when it is detected at a switch that the power distribution circuit has developed a fault which necessitates the transmission of a DZSI signal, e.g. a short circuit in the power distribution circuit (S fault), and a short-delay short circuit signal needs to be transmitted, then each switch in the DZSI system changes to the DZSI signal transceiving mode; once the short-delay short circuit fault has disappeared, each switch changes back to the link inspection mode. FIG. 17 shows a flow chart for DZSI signal transceiving by each switch (including query switches and non-query switches). Referring to FIG. 17, the procedure for DZSI signal transceiving by any switch comprises the following steps:

Step 71: determining whether an S fault signal has been received, and if so, performing step 72, otherwise continuing to operate in the link inspection mode.

Step 72: turning off ports AIO and BIO.

Step 73: turning off switch units SAOD, SBOD, SAID and SBID.

Step 74: delaying for a certain time (e.g. 15 ms), to wait for the fault current direction to be determined.

Step 75: setting ports AIO and BIO to be an input or output port according to the fault current direction, so that a DZSI signal is transmitted in the correct feed direction.

Step 76: turning on switch units SOE, SIE, SS1, SS2, SS3 and SS4.

Step 77: performing the procedure for DZSI signal sending or receiving. The procedure for DZSI signal sending or receiving is the same as that disclosed in the prior Siemens application 2013P03062CN, and is only described briefly here. With regard to the fault current direction, the DZSI signal sending branch of a downstream switch is connected to the DZSI signal receiving branch of an upstream switch via the output bus BUS_O of the downstream switch, the downstream switch's AIO or BIO which has been set to be an output port, the upstream switch's AIO or BIO which has been set to be an input port, and the input bus BUS_I of the upstream switch, to form a complete circuit. Thus a DZSI signal So_x that is applied to the base of the bipolar junction transistor in the DZSI signal sending branch of the downstream switch is converted to a light signal Si_x from the LED in the DZSI signal receiving branch of the upstream switch, and the light signal Si_x is read out by the upstream switch, thereby realizing transmission of the DZSI signal from the downstream switch to the upstream switch.

Step 78: once the S fault has disappeared, changing to the link inspection mode. Generally, based on DZSI signal transmission, the DZSI system will selectively turn off the appropriate switch, to make the S fault disappear, at which point each switch in the DZSI system goes back to operating in the link inspection mode, i.e. query switches continue to perform steps 41 to 54 above, while non-query switches continue to perform steps 51 to 58 above.

Figure 18:
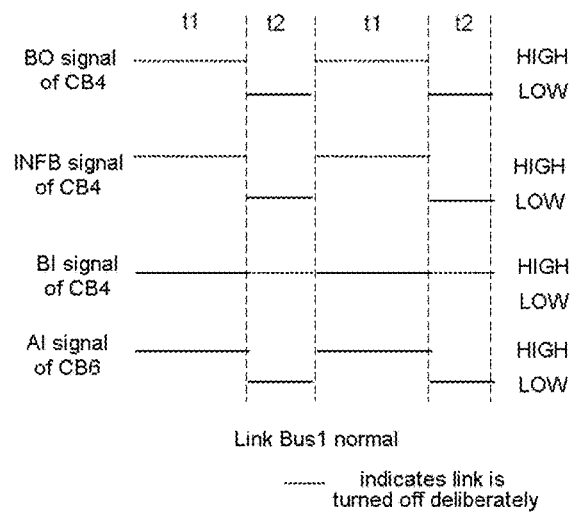
FIG. 18 shows the waveform combination of the relevant signals in the case where the DZSI link BUS1 connecting switches CB4 and CB6 is normal, in another embodiment of the present invention.
Figure 19:
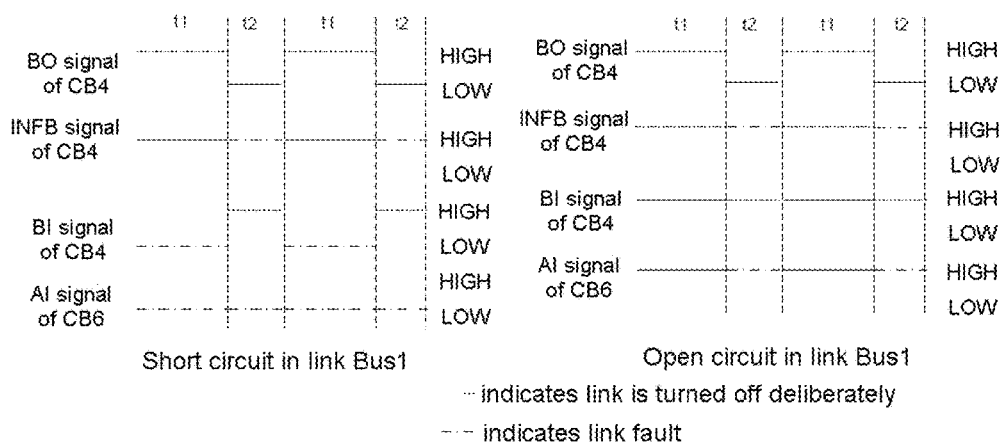
FIG. 19 shows the waveform combinations of the relevant signals in the cases where the DZSI link BUS1 connecting switches CB4 and CB6 has a short circuit and open circuit, respectively.

Furthermore, based on the mixed DZSI system of FIG. 1, taking switches CB4 and CB6 as an example, the signal combinations corresponding to the situations where the DZSI link connecting switches CB4 and CB6 is normal, and connected with reversed polarity, respectively, are the same as in FIG. 9, wherein the BI signal of CB4 refers to a signal in the case where port BIO of CB4 serves as an input port, while the AI signal of CB6 refers to a signal in the case where port AIO of CB6 serves as an input port. FIG. 18 shows the waveform combination of the relevant signals in the case where the DZSI link BUS1 (i.e. the communication link between zone selective interlocking devices ETU4 and ETU6 in FIG. 1) connecting switches CB4 and CB6 is normal. FIG. 19 shows the waveform combinations of the relevant signals in the cases where the DZSI link BUS1 connecting switches CB4 and CB6 has a short circuit and open circuit, respectively. Based on the waveform combinations shown in FIG. 19, it is possible to precisely determine various types of fault in the link inspection mode (e.g. a short circuit fault and open circuit fault).

Figure 20:
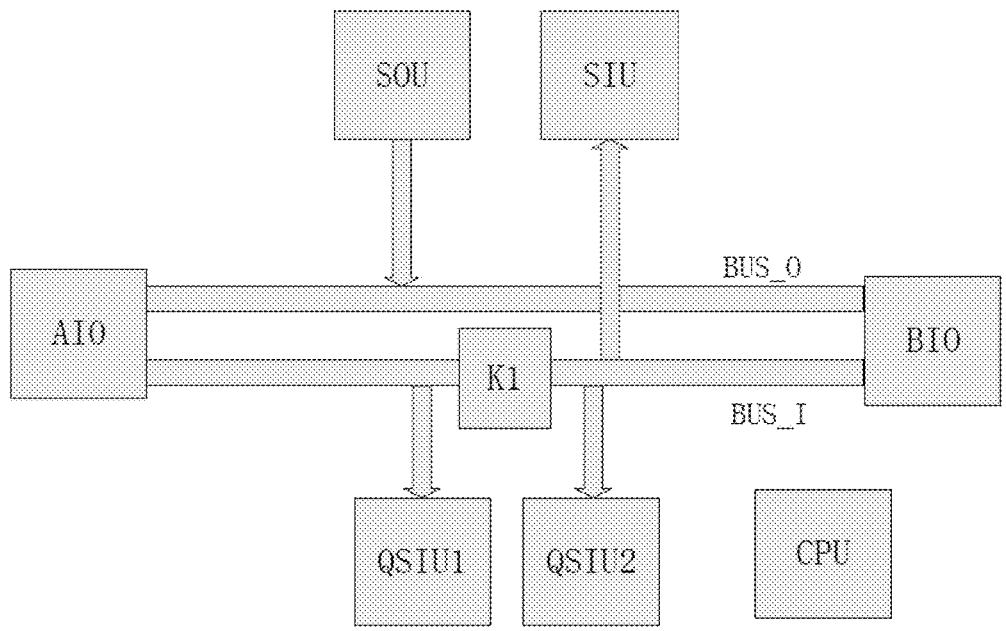
FIG. 20 shows a modular schematic diagram of a DZSI device which can be used for a non-query switch in another embodiment.
Figure 21:
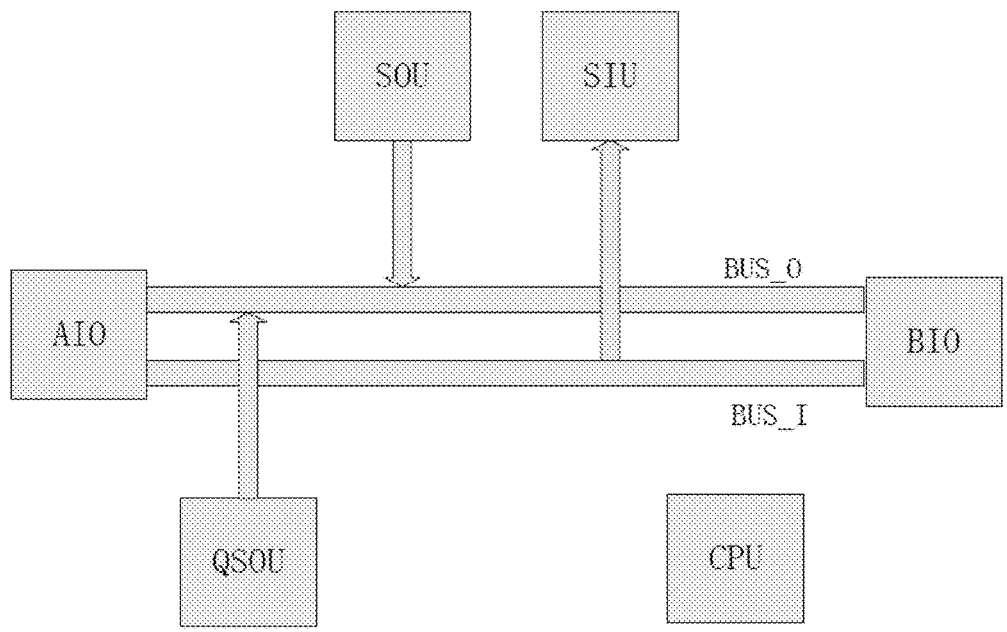
FIG. 21 shows a modular schematic diagram of a DZSI device which can be used for a query switch in another embodiment.

Besides the embodiments described above, many other modified embodiments of the present invention are also possible. For example, with regard to non-query switches, the DZSI device may have the structure shown in FIG. 20, i.e. with the query signal sending branch in the embodiment of FIG. 3 omitted. With regard to query switches, the DZSI device may have the structure shown in FIG. 21, i.e. with the first query signal receiving branch, second query signal receiving branch, and the switch unit K1 on the input bus BUS_I in the embodiment of FIG. 3 omitted. The remaining variations of the DZSI device are not listed here one by one.

The embodiments above are merely particular illustrative embodiments of the present invention, which are not intended to define the scope thereof. Any equivalent changes, amendments or combinations made by those skilled in the art without departing from the concept and principles of the present invention should fall within the scope of protection thereof.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A zone selective interlocking device, comprising:
a first port;
a second port;
an input bus;
an output bus; and
a query signal receiving branch, two ends of the input bus and output bus being connected to the first port and second port, respectively, the first port and second port each switchable between a first state of being connected to the input bus and a second state of being connected to the output bus, the zone selective interlocking device being operable in a first mode,
wherein, in the first mode, the query signal receiving branch is turned on, and within a timeslot, a link fault query signal is permitted to be inputted to the query signal receiving branch through one of the first and second ports, while a link fault query signal is prevented from being inputted to the query signal receiving branch through another of the first and second ports, and
wherein, based on whether a link fault query signal is received within the timeslot, a judgment is made on whether a fault has occurred in a communication link connected to a corresponding one of the first and second ports.

2. The zone selective interlocking device of claim 1, further comprising:
a communication signal sending branch, connected to the output bus; and
a communication signal receiving branch connected to the input bus, the zone selective interlocking device being switchable between the first mode and a second mode;
wherein, in the first mode, the communication signal receiving branch and the communication signal sending branch are turned off; and
wherein, in the second mode, the communication signal receiving branch and the communication signal sending branch are turned on, while the query signal receiving branch is turned off, and one of the first port and second port is set to be in the state of being connected to the input bus, and the other of the first and second port is set to be in the state of being connected to the output bus.

3. The zone selective interlocking device of claim 2, further comprising:
a first switch unit disposed on the input bus;
another query signal receiving branch, the query signal receiving branch and the another query signal receiving branch being connected to the input bus on two sides of the first switch unit; wherein
in the first mode, the first switch unit is turned off, and within the timeslot,
the first port is set to be in the state of being connected to the input bus, to permit a link fault query signal to be inputted to one of the two query signal receiving branches through the first port, and
the second port is set to be in the state of being connected to the input bus, to permit a link fault query signal to be inputted to the other of the two query signal receiving branch through the second port;
in the second mode, the first switch unit is turned on.

4. The zone selective interlocking device of claim 3, further comprising:
a query signal sending branch connected to the output bus, settable to be in a first configuration or a second configuration; wherein
when the query signal sending branch set to be in the first configuration, the zone selective interlocking device switches between the first mode and the second mode, wherein the query signal sending branch is turned off in the second mode; and
when the query signal sending branch set to be in the second configuration, the zone selective interlocking device is switchable between the second mode and a third mode, wherein the query signal sending branch is turned off in the second mode;
and wherein, in the third mode, the communication signal receiving branch and communication signal sending branch are turned off, the query signal sending branch is turned on, and within the timeslot, a link fault query signal is permitted to be outputted from the query signal sending branch to one of the first and second ports, and a link fault query signal is prevented from being outputted from the query signal sending branch to another of the first and second ports.

5. The zone selective interlocking device of claim 4, wherein, in the third mode, the timeslot comprises a first timeslot and a second timeslot; and wherein
within the first timeslot, the first port is set to be in the state of being connected to the output bus, and the second port is set to be in the state of being connected to the input bus; and
within the second timeslot, the first port is set to be in the state of being connected to the input bus, while the second port is set to be in the state of being connected to the output bus.

6. The zone selective interlocking device of claim 5, wherein the query signal sending branch comprises:
a bipolar junction transistor,
an LED, and
a switch unit connected in series, the LED being between the switch unit and the bipolar junction transistor, wherein the bipolar junction transistor, by way of an emitter and collector of the bipolar junction transistor, is connected in series in the circuit formed by the series-connected LED and switch unit, a base of the bipolar junction transistor is used for receiving an excitation signal, and a conducting direction of the LED is a same as a direction from the emitter to the collector of the bipolar junction transistor.

7. The zone selective interlocking device of claim 4, further comprising:
a second switch unit disposed on the output bus, the two query signal sending branches being connected to the output bus on two sides of the second switch unit, respectively;
wherein, in the third mode, the second switch unit is turned off, and within the timeslot, the first port is set to be in the state of being connected to the output bus, to permit a link fault query signal to be outputted from one of the two query signal sending branches to the first port, and the second port is set to be in the state of being connected to the output bus, to permit a link fault query signal to be outputted from the other of the two query signal sending branches to the second port; and
in the second mode, the second switch unit is turned on.

8. The zone selective interlocking device of claim 7, wherein the query signal sending branch comprises:
a bipolar junction transistor,
an LED, and
a switch unit connected in series, the LED being between the switch unit and the bipolar junction transistor, wherein the bipolar junction transistor, by way of an emitter and collector of the bipolar junction transistor, is connected in series in the circuit formed by the series-connected LED and switch unit, a base of the bipolar junction transistor is used for receiving an excitation signal, and a conducting direction of the LED is a same as a direction from the emitter to the collector of the bipolar junction transistor.

9. The zone selective interlocking device of claim 4, wherein the query signal sending branch comprises:
a bipolar junction transistor,
an LED, and
a switch unit connected in series, the LED being between the switch unit and the bipolar junction transistor, wherein the bipolar junction transistor, by way of an emitter and collector of the bipolar junction transistor, is connected in series in the circuit formed by the series-connected LED and switch unit, a base of the bipolar junction transistor is used for receiving an excitation signal, and a conducting direction of the LED is a same as a direction from the emitter to the collector of the bipolar junction transistor.

10. The zone selective interlocking device of claim 2, wherein the query signal receiving branch comprises the following, connected in series:
a current-limiting resistor,
a switch unit, and
a sensitive element between the current-limiting resistor and the switch unit for identifying a change in current or voltage in the circuit formed by the series-connected current-limiting resistor and switch unit.

11. The zone selective interlocking device of claim 10, wherein the sensitive element is a light-emitting diode (LED), connected in series in the circuit formed by the series-connected current-limiting resistor and switch unit.

12. The zone selective interlocking device of claim 2, further comprising a control unit to control the zone selective interlocking device to switch between different modes and perform operations in the various modes.

13. The zone selective interlocking device of claim 1, wherein, in the first mode, the timeslot comprises a first timeslot and a second timeslot and within the first timeslot, the first port is set to be in the state of being connected to the input bus and the second port is set to be in the state of being connected to the output bus; and within the second timeslot, the first port is set to be in the state of being connected to the output bus and the second port is set to be in the state of being connected to the input bus.

14. The zone selective interlocking device of claim 13, wherein the query signal receiving branch comprises the following, connected in series:
a current-limiting resistor,
a switch unit, and
a sensitive element between the current-limiting resistor and the switch unit for identifying a change in current or voltage in the circuit formed by the series-connected current-limiting resistor and switch unit.

15. The zone selective interlocking device of claim 14, wherein the sensitive element is a light-emitting diode (LED), connected in series in the circuit formed by the series-connected current-limiting resistor and switch unit.

16. The zone selective interlocking device of claim 1, wherein the query signal receiving branch comprises the following, connected in series:
a current-limiting resistor,
a switch unit, and
a sensitive element between the current-limiting resistor and the switch unit for identifying a change in current or voltage in the circuit formed by the series-connected current-limiting resistor and switch unit.

17. The zone selective interlocking device of claim 16, wherein the sensitive element is a light-emitting diode (LED), connected in series in the circuit formed by the series-connected current-limiting resistor and switch unit.

18. The zone selective interlocking device of claim 1, further comprising a control unit to control the zone selective interlocking device to switch between different modes and perform operations in the various modes.

19. A zone selective interlocking device, comprising:
a first port;
a second port;
an input bus;
an output bus; and
a query signal sending branch, two ends of the input bus and output bus being connected to the first port and second port, respectively, the first port and second port each being switchable between two states, connected to the input bus and being connected to the output bus, the second port also being switchable between two states, connected to the input bus and being connected to the output bus,
the zone selective interlocking device being operable in a third mode wherein the query signal sending branch is turned on, and within a timeslot, a link fault query signal is permitted to be outputted from the query signal sending branch to one of the first and second ports while a link fault query signal is prevented from being outputted from the query signal sending branch to another of the first and second ports.

20. The zone selective interlocking device of claim 19, further comprising:
a communication signal sending branch connected to the output bus; and
a communication signal receiving branch connected to the input bus, the zone selective interlocking device being switchable between the third mode and a second mode; wherein
in the second mode, the communication signal receiving branch and the communication signal sending branch are turned on, while the query signal receiving branch is turned off, and one of the first port and second port is set to be in the state of being connected to the input bus, while the other of the first port and second port is set to be in the state of being connected to the output bus; and
in the third mode, the communication signal receiving branch and communication signal sending branch are turned off.

21. The zone selective interlocking device of claim 20, further comprising:
a second switch unit, disposed on the output bus; and
another query signal sending branch, the two query signal sending branches being connected to the output bus on two sides of the second switch unit, respectively; wherein
in the third mode, the second switch unit is turned off, and within the timeslot, the first port is set to be in the state of being connected to the output bus, to permit a link fault query signal to be outputted from one of the query signal sending branches to the first port, and the second port is set to be in the state of being connected to the output bus, to permit a link fault query signal to be outputted from the other of the query signal sending branches to the second port; and in the second mode, the second switch unit is turned on.

22. The zone selective interlocking device of claim 19, wherein, in the third mode, the timeslot comprises a first timeslot and a second timeslot; and wherein within the first timeslot, the first port is set to be in the state of being connected to the output bus, while the second port is set to be in the state of being connected to the input bus; and within the second timeslot, the first port is set to be in the state of being connected to the input bus, while the second port is set to be in the state of being connected to the output bus.

23. The zone selective interlocking device of claim 19, wherein the query signal sending branch comprises:

a bipolar junction transistor, an LED, and a switch unit connected in series, the LED being between the switch unit and the bipolar junction transistor, wherein the bipolar junction transistor, by way of an emitter and collector of the bipolar junction transistor, is connected in series in the circuit formed by the series-connected LED and switch unit, and wherein a base of the bipolar junction transistor is used for receiving an excitation signal, and a conducting direction of the LED is the same as a direction from the emitter to the collector of the bipolar junction transistor.

\* \* \* \* \*